(12) United States Patent
Tietzen

(10) Patent No.: US 11,900,356 B2
(45) Date of Patent: *Feb. 13, 2024

(54) CUSTOMER VOICE ORDER TRIGGERED MUTUAL AFFINITY MERCHANT DONATION

(71) Applicant: EDATANETWORKS INC., Calgary (CA)

(72) Inventor: Terrance Patrick Tietzen, Edmonton (CA)

(73) Assignee: EDATANETWORKS INC., Edmonton (CA)

( * ) Notice: Subject to any disclaimer, the term of this patent is extended or adjusted under 35 U.S.C. 154(b) by 161 days.

This patent is subject to a terminal disclaimer.

(21) Appl. No.: 17/225,613

(22) Filed: Apr. 8, 2021

(65) Prior Publication Data

US 2021/0295307 A1 Sep. 23, 2021

Related U.S. Application Data

(63) Continuation of application No. 16/570,733, filed on Sep. 13, 2019, now Pat. No. 11,010,750, which is a continuation of application No. 14/647,119, filed on May 25, 2015, now Pat. No. 10,445,725.

(51) Int. Cl.
| | | |
|---|---|---|
| *G06Q 20/34* | (2012.01) | |
| *G06Q 30/0207* | (2023.01) | |
| *G10L 13/027* | (2013.01) | |
| *G06Q 30/0251* | (2023.01) | |
| *G06Q 20/40* | (2012.01) | |
| *G06Q 30/0241* | (2023.01) | |
| *G06Q 20/20* | (2012.01) | |
| *G06Q 30/02* | (2023.01) | |
| *G06Q 20/32* | (2012.01) | |
| *G10L 15/26* | (2006.01) | |

(Continued)

(52) U.S. Cl.
CPC ............ *G06Q 20/34* (2013.01); *G06Q 20/20* (2013.01); *G06Q 20/322* (2013.01); *G06Q 20/405* (2013.01); *G06Q 30/02* (2013.01); *G06Q 30/0239* (2013.01); *G06Q 30/0257* (2013.01); *G06Q 30/0267* (2013.01); *G06Q 30/0276* (2013.01); *G10L 13/027* (2013.01); *G10L 15/26* (2013.01); *G10L 13/00* (2013.01); *G10L 15/00* (2013.01)

(58) Field of Classification Search
CPC .................................................. G06Q 30/0279
See application file for complete search history.

(56) References Cited

U.S. PATENT DOCUMENTS

2013/0103603 A1* 4/2013 Merriman .......... G06Q 30/0279
705/329

* cited by examiner

*Primary Examiner* — Ojo O Oyebisi
(74) *Attorney, Agent, or Firm* — Bradley K. DeSandro; DESANDRO LAW GROUP PLLC

(57) ABSTRACT

A customer uses a mobile device to verbally request an offer that includes an incentive to transact at a merchant's brick and mortar store in the customer's local community in exchange for the merchant's agreement to make an auditable donation to a charity serving the local community. Business rules limit the merchant's charitable donations over calendar periods, which donations can be made directly by the merchant to the community charity, or indirectly to the charity by way of a blind donation made by the merchant to a donation disbursement agency acting on the merchant's behalf to satisfy the merchant's commitment to donate.

20 Claims, 14 Drawing Sheets

(51) Int. Cl.
*G10L 13/00* (2006.01)
*G10L 15/00* (2013.01)

Merchant Affinity Entity Donations
Merchant ID: EIN # 12-345-67890
Merchant CommunityID: ZZZ999

| Day | Time (HH:MM) | % | Min | Max | Affinity |
|-----|--------------|------|------|-------|----------|
| 001 | 99:99 – 99:99 | 9.99 | 9.99 | 99.99 | 999(i)(j) |
| 001 | 99:99 – 99:99 | 9.99 | 9.99 | 99.99 | 999(i)(j) |
| 002 | 99:99 – 99:99 | 9.99 | 9.99 | 99.99 | 999(i)(j) |
| 002 | 99:99 – 99:99 | 9.99 | 9.99 | 99.99 | 999(i)(j) |
| 003 | 99:99 – 99:99 | 9.99 | 9.99 | 99.99 | 999(i)(j) |
| * * * | * * * | * * * | | | * * * |
| 354 | 99:99 – 99:99 | 9.99 | 9.99 | 99.99 | 999(i)(j) |
| 354 | 99:99 – 99:99 | 9.99 | 9.99 | 99.99 | 999(i)(j) |
| 355 | 99:99 – 99:99 | 9.99 | 9.99 | 99.99 | 999(i)(j) |
| 355 | 99:99 – 99:99 | 9.99 | 9.99 | 99.99 | 999(i)(j) |
| 356 | 99:99 – 99:99 | 9.99 | 9.99 | 99.99 | 999(i)(j) |

Maximum Donations: Year: $99999; Qtr: $9999;
Mo: $9999; Day: $999

*Fig. 3a*

Account Holder Directed
Merchant Funded Affinity Entity Donations
Account No. Ending 1235

| Affinity | % | Community ID | Affinity Name |
|----------|--------|--------|---------------|
| 999(i)(j) | 999.99 | ZZZ999 | dddddddddddddddddddddddddd |
| 999(i)(j) | 999.99 | ZZZ999 | dddddddddddddddddddddddddd |
| 999(i)(j) | 999.99 | ZZZ999 | dddddddddddddddddddddddddd |
| * * * | * * * | * * * | * * * |
| 999(i)(j) | 999.99 | ZZZ999 | dddddddddddddddddddddddddd |
| 999(i)(j) | 999.99 | ZZZ999 | dddddddddddddddddddddddddd |
| 999(i)(j) | 999.99 | ZZZ999 | dddddddddddddddddddddddddd |
| 999(i)(j) | 999.99 | ZZZ999 | dddddddddddddddddddddddddd |

402:
- Initiate Mobile App;
- Receive Spoken Keyword;
- Transmit:
(i) Speech containing (i) Keyword;
(ii) Geo-Location;
(iii) Customer ID;

404:
Speech-To-Text Keyword Conversion;
Database access, look-up, and match:
(i) Residential Community corresponding to Customer ID;
(ii) Derive $1^{st}$ set of Merchants: B&M Merchant located in Residential Community corresponding to Customer ID;
(iii) Derive $2^{nd}$ set of Merchants: Merchants in $1^{st}$ set w/ MCC and/or G/S attribute matching the Keyword;
(iv) Derive $3^{rd}$ set of Merchants: Merchants in $2^{nd}$ set having an unexpired offer to an Affinity Entity corresponding to the Residential Community;
(v) Calculate navigation (distance/time) from Mobile Device Geo-Location to each Merchant in the $3^{rd}$ set;

408:
(i) App Receives and renders Text-To-Speech conversion for each Merchant in the $3^{rd}$ set;
(ii) App receives and transmits speech containing selected merchant in the $3^{rd}$ set

406:
For each Merchant the $3^{rd}$ set, Text-To-Speech conversion:
(i) Merchant Identifier (Name/Location/Keyword);
(ii) Navigation (distance/time);
(iii) Unexpired offer to Affinity Entity
(iv) Optional: other Unexpired offer (e.g.; Advertisement);
Terms and conditions of offer(s);
(v) Transmit Text-To-Speech conversion for each Merchant the $3^{rd}$ set to logical address of mobile device for audio rendering;

410:
(i) Speech-To-Text Conversion of speech containing selected merchant in the $3^{rd}$ set;
(ii) Text-To-Speech Conversion of "Request To Confirm Selection" of merchant in the $3^{rd}$ set;
(vi) Transmit "Request To Confirm Selection" to Mobile App;

414:
- Speech-To-Text conversion of the confirmation of the Selected Merchant in the $3^{rd}$ set;
- Ensure matching confirmation;
- Transmit to logical address of the Selected Merchant in the $3^{rd}$ set as a 'staged transaction':
(i) Customer Identifier (Name/Location/Keyword)
(ii) Navigation (distance/time)
(iii) Unexpired offer to Affinity Entity
(iv) Optional: other Unexpired offer (e.g.; Advertisement),
Terms and conditions of offer(s);

412:
(i) App Receives and renders "Request To Confirm Selection" of merchant in the $3^{rd}$ set;
(ii) App receives and transmits spoken confirmation of selected merchant in the $3^{rd}$ set;

418:
- Calculate donation by Selected Merchant in the $3^{rd}$ set to the Affinity Entity corresponding to the Residential Community;
- Transmit the calculated donation (and optionally terms of the offer and the identity of Affinity Entity) to one or more of these logical addresses:
(i) Selected Merchant in the $3^{rd}$ set;
(ii) the Affinity Entity corresponding to the Residential Community;
(iii) the Customer;

416:
Receive transmission containing indicator of positive authorization response for transaction with the Selected Merchant in the $3^{rd}$ set on an account corresponding to Customer ID;

420:
After a predetermined audit time period, audit payable vs. paid Merchant donations to Affinity Entity, and send notice of same

Interchange Center Systems 840

Dual Message

Single Message

Authorization

Authorization System 842

Single Message System (SMS) 846

Clearing

Clearing And Settlement System 844

Settlement

Settlement Service 848

*Fig. 8*

CUSTOMER VOICE ORDER TRIGGERED MUTUAL AFFINITY MERCHANT DONATION

CROSS REFERENCE TO RELATED APPLICATIONS

This is a continuation of U.S. Utility patent application Ser. No. 16/570,733, titled "Customer Voice Order Triggered Mutual Affinity Merchant Donation," filed on Sep. 13, 2019, which is a continuation of U.S. Utility patent application Ser. No. 14/647,119, titled "Customer Voice Order Triggered Mutual Affinity Merchant Donation," filed on May 28, 2015, now U.S. Pat. No. 10,445,725, which claims priority to PCA/CA2013/000971, filed on Nov. 29, 2013, which claims priority to Provisional application Ser. No. 61/732,152, filed on Nov. 30, 2012, with all of the foregoing being incorporated herein by reference.

FIELD

Embodiments described herein generally relate to an incentive by a merchant having a physical store in a community to encourage a consumer residing in the community to make a purchase in the physical store.

BACKGROUND

The use of web enabled mobile computing devices is a growing and ubiquitous factor in customers searching for and finding offers from merchants. An inherent safety problem with such mobile device use is that its user can be distracted in ways that are hazardous to both user and bystanders. By way of example, the user may make the mistake of operating a vehicle or walking near vehicular traffic while using the mobile device's physical or virtual keyboard to give input and/or view output rendered on its display screen. It would be an advance in the art of mobile commerce to provide an application for web enabled computing devices that allows their users to search for, find, and place offers from merchants without requiring physical or virtual keyboard input or display screen rendered output viewing.

Merchants may use techniques to prompt consumers into making a particular purchase. These techniques may be in the form of monetary incentives, relying on the principle that a lower price will result in increased sales. Merchants may employ these techniques, for example, to help clear inventory before a new season's merchandise is released, to ease the release of a new product, to increase sales near the end of the fiscal year, to compete with a competitor over particular products, or to generally spur sales. Monetary incentives may come in the form of a "sale" (i.e., temporary reduction in price at the register), a discount coupon, a mail-in rebate (i.e., a refund of part or the entire purchase price by mail), or a store credit (i.e., credit that can be applied to another store purchase). These incentives may only apply to a particular product and have a time component. For example, a sale may only apply to a particular brand of dishwasher purchased on a particular holiday weekend and a rebate may only be valid for computers purchased within two weeks before the start of classes at a university. Although consumers are typically incented to make purchases by a form of price reduction, non-monetary reasons may also motivate consumers to make purchases with a merchant, for instance where the consumers believes that the merchant is a force for good and thus the consumers are non-monetarily incented to do business with the merchant who they deem worthy of such support. There exists a need for platforms, systems, methods, devices that may provide a non-monetary incentive motivate a consumer to conduct a transaction with a merchant, or at least an alternative.

Another problem for merchants, especially small to mid-sized merchants, may be that an increasing number of transactions are conducted online instead of inside brick and mortar stores. Online transactions conducted with larger merchants can represent a loss in sales to traditional small and medium size merchants whose main business method to attract sales may be a traditional retail, brick and mortar store environment, instead of mail orders, telephone orders, and/or electronic commerce (e-commerce) transactions. The loss of the in-store purchase may be a lost opportunity for the local merchant and local customer to get to know each other, personally, and a lost opportunity for the local customer to become a live advertisement for the merchant's retail store and its wares. Online sales also prohibit the traditional brick and mortar merchant from an opportunity to sell customers in a retail environment best understood by the merchant. The loss of in-store purchases to online sales may cause economic problems for traditional small and medium size merchants and the communities they serve. In some neighborhoods, the number of small retail shops may dramatically decline, leaving community commercial areas in a state of blight and disuse. In addition to economic downturn sensitivities, small, family-owned stores also face extinction threats from sophisticated online retailers, with resultant losses to local community retail diversity and neighborhood health with the death of the neighborhood 'mom-and-pop' store. Neighborhood streets can seem vacant during the day and open only after 5 p.m. to serve the interests of only one demographic, namely young urban professionals with disposable income. Previously successful businesses have been closing when e-commerce competition from online auctions and retailers attract previously loyal neighbors.

There exists a need for platforms, systems and methods that may shift sales revenue towards neighborhood merchants away from electronically competing merchants. There exists a need for platforms, systems and methods that may shift sales tax revenue towards neighborhood authorities that would otherwise be lost to e-commerce transactions, or at least alternatives. There exists a need for platforms, systems and methods that incents local merchants in the community to receive foot traffic from customers that are incidentally doing in-person shopping with other brick and mortar merchants, or at least alternatives. There exists a need for platforms, systems and methods that provides an incentive to a customer, who would have otherwise only window-shopped a product at the brick and mortar store of a local merchant but then buy that product on-line from an electronic competitor merchant, to buy that product at the brick and mortar store of the local merchant.

A merchant having a local, brick and mortar store may enjoy the sale of goods and/or services to customers who conduct in-person, card-present, brick and mortar transactions with the merchant. The merchant, however, may wish to acquaint these brick-and-mortar customers with the merchant's online presence. The merchant's goal with beginning such an acquaintance may be to increase the merchant's notoriety and reputation with its brick-and-mortar customers, to show appreciation for their brick-and-mortar purchases and/or to increase the merchant's sale of goods and/or services with those customers whose prior transactions with the merchant were limited to card-present, in-person, brick and mortar transactions. Accordingly, there is need in the relevant arts for systems and methods to incent this acquaintance.

SUMMARY

Embodiments described herein relate to a consumer using a mobile application to verbally request offers, receive the requested offers, select an offer from among received offers, and confirm the selected offer, where the consumer is incented to the selected offer by terms and conditions that include the selected merchant in the customer's residential community making a donation to an entity to which both the merchant and the consumer have an affinity after the consumer conducts a timely transaction in the selected merchant's physical store.

Embodiments described herein relate to a computer-implemented method and server-implemented methods where there is received, from a transmitter, an account holder identifier and digitized audio data containing a request for an offer from a local merchant to local customers to make a purchase from the local merchant in exchange for the local merchant making a donation to a local charity. The request may be derived from the digitized audio data. The derived request may be used to access and retrieve offers each being from a local merchant to local customers to make a purchase from the local merchant in exchange for the local merchant making a donation to a local charity. The retrieved offers may be converted into a digitized audio file and transmitted back to the transmitter. In response, there may be received a digitized audio data containing a selection of one of the retrieved offers. The selected offer is derived from the digitized audio data. Upon receiving information derived from an authorization response for a transaction between the account holder and the local merchant making the selected offer, a message may be sent that contains the donation to be made to the local charity by the local merchant who made the selected offer. After several such message have been sent, each containing the donation to be made to the local charity by local merchant making the selected offer, a calculation may be made of the sum of the donations in the messages. Information may also be received from the local charity as to the total donations that have been made so far by the local merchant who made the selected offers. Any difference between what the local merchant making the selected offers was to donate to the local charity and the local merchant's actual donations may be transmitted for follow up. In some implementations, the donation to be made to the local charity by local merchant making the selected offer is a function, at least in part, of a currency amount of the transaction.

Variations on the foregoing implementations include allowing the customer to specify one or more affinity entities (e.g., charities) providing goods and/or services in their local community to which donations are to made by merchants with whom the customer conducts transactions. In such implementations, each merchant may be given notice of its total periodic obligatory donations. Such notice, however, may be given without providing the merchant with any notice or knowledge as to the specific identity of those affinity entities that are to be its recipients. Such implementations may leave direction of merchants donations fully within the discretion of the merchants customers, limited only by the restriction that the customer can only select affinity entities from among those that serve the local community in common to both the merchant and the customer, while leaving the actual amount of the merchants donation fully within the discretion of the merchant.

Still further variations on the foregoing implementations include deriving a donation to be made by the merchant to the affinity entity for a predetermined time period by using a merchant donation business rule as well as a rule previously specified by the account holder who conducts the transaction with the merchant. By way of example, and not by way of limitation, the merchant's donation business rule may choose the amount of the donation whereas the account holder's rule might choose the affinity entity in the community to which the merchants donation is to be directed.

It will be appreciated that the foregoing summary merely describes exemplary, illustrative and non-limiting implementations.

BRIEF DESCRIPTION OF THE DRAWINGS

Non-limiting and non-exhaustive aspects are described with reference to the following figures, wherein like reference numerals refer to like parts throughout the various figures unless otherwise specified.

FIGS. 3a and 3b illustrate screen shots characterizing exemplary user interfaces for a merchant and a customer, respectively, to designate one or more affinity entities to whom contributions by the merchant are to be made incident to each transaction there between, where each merchant or customer specified affinity entity provides goods or services to a community in common to both the merchant and the customer;

FIG. 4 is a flowchart illustrating yet another exemplary process that that allows a web enabled mobile computing device user to search for, find, and select an offer from a merchant, without use of the device's keyboard or display screen, where the users subsequent transaction obligates the selected merchant to make an audited donation to an affinity entity that providing goods and/or services to a community in common to both the user and the selected merchant;

FIG. 8 illustrates exemplary systems housed within an interchange center to provide online and offline transaction processing for transactions conducted using the open loop payments processing system illustrated in FIG. 7.

Figure 1:
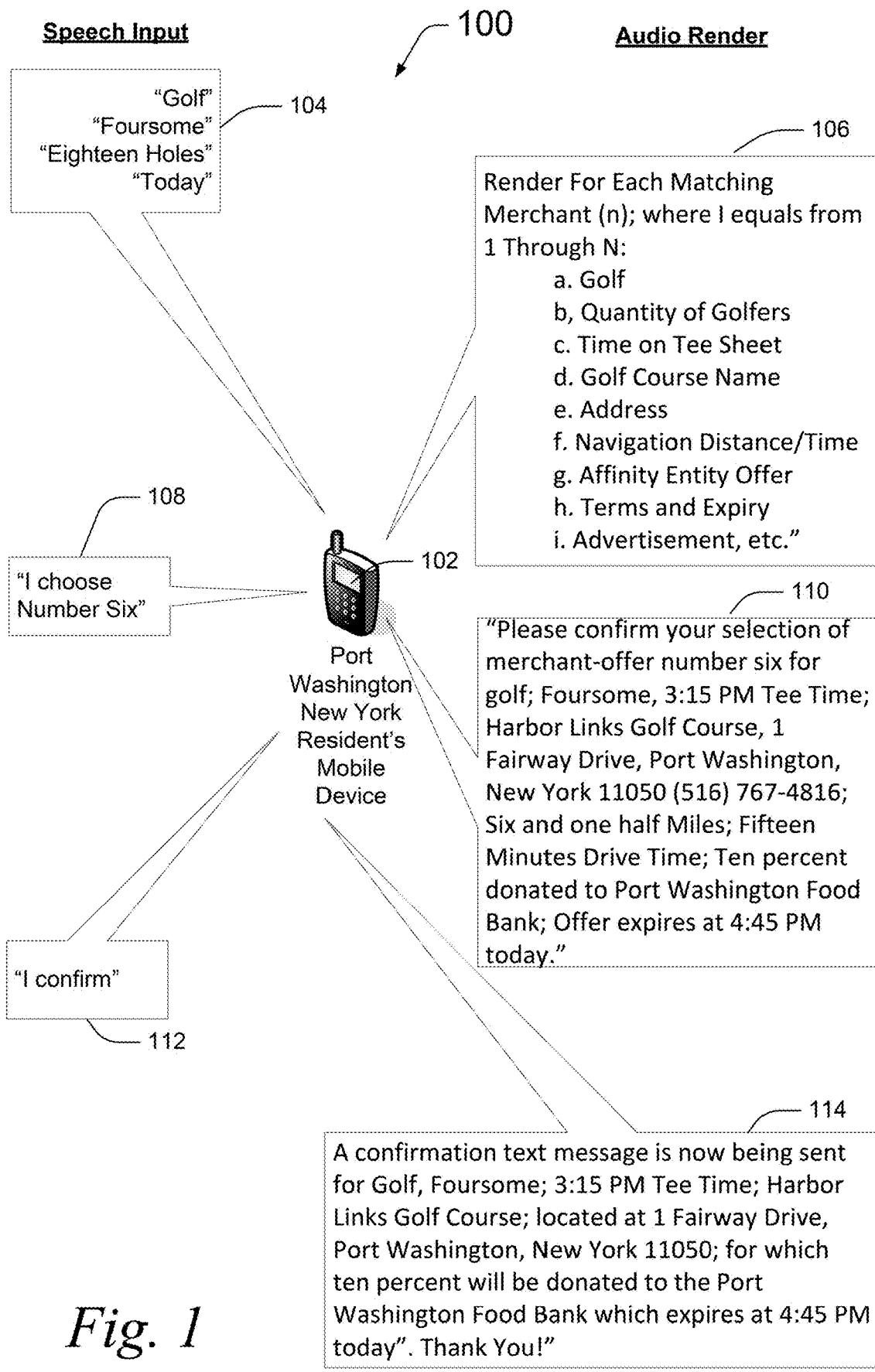
FIG. 1 is a schematic illustrating an exemplary audio dialog that is chronologically spoken as input and responsively heard as rendered audio output by use of an application executing on a web enabled mobile computing device.

Implementations will become more apparent from the detailed description set forth below when taken in conjunction with the drawings.

DETAILED DESCRIPTION

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or a combination thereof, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer usable instructions may also be in various forms, including compiled and non-compiled code.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the systems and methods described herein may involve the execution of transaction and transfer of value between merchants and consumers to provide economic and commercial benefits. One should appreciate that the systems and methods described herein may involve particular configuration of computer hardware components to provide incentives to consumers and transfer value between consumers, merchants, card issuers, and affinity entities. One should appreciate that the systems and methods described herein may involve an interconnected network of computer hardware for transferring electronic data signals and executing transactions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Referring now to FIG. 1, an interactive audio dialog 100 is represented by a showing of commands spoken by a user of a web enabled mobile computing device 102. By executing an application, responses to the commands may be audibly rendered by the web enabled mobile computing device 102. In a first command seen at reference numeral 104, after initiating the application to execute on the web enabled computing device 102, the user speaks a request for an offer from one or more merchants according to terms and conditions specified in the command Command 104 includes four (4) terms and conditions: "Golf"; (ii) "Foursome"; (iii) "Eighteen Holes"; and (iv) "Today". This is an illustrative example only.

The speech of audio Command 104 may be digitized and transmitted by the web enabled mobile computing device 102. In response to Command 104, an Offer Group 106 is received and audibly rendered by execution of the application executed on the web enabled mobile computing device 102. Each offer from each merchant in offer group 106 may include terms and conditions in compliance with that of audio Command 104. Each offer in offer group 106 may be made by a merchant having a brick and mortar location in the residential community of the user of the web enabled mobile computing device 102. As such, each offer from each merchant in Offer Group 106 includes the terms and conditions of (i) an offer to provide golfing services; (ii) for a particular number of golfers; (iii) at a specified tee time; (iv) at a community Golf Course; (v) at the location of the Golf Course; (vi) where the location requires a calculated Distance/Time to navigate from the present location of the web enabled local device 102; (vii) where the merchant commits to make a donation to an Affinity Entity that provides goods and/or services to the residential community of the user where the brick and mortar store of the merchant is also located; and (viii) where each merchant's offer has other terms and conditions, such as a time and date by which a transaction between the user and the merchant must take place in order to obligate the merchant to make the offered donation to the Affinity Entity; and (ix) optionally, the merchant's advertisement, and so on.

Upon hearing the audible rendering of Offer Group 106, the user speaks a selection of one of the merchant-offers in Offer Group 106. The user's selection, as shown at reference numeral 108, may be made by speaking "I choose Number Six." This is an example only. The speech of audio Command 108 may be digitized and transmitted by the web enabled mobile computing device 102. Responsive to Command 108, a request for confirmation may be received and audibly rendered by execution of the application executed on the web enabled mobile computing device 102. The request for confirmation seen at reference numeral 110, corresponding to user's selection of the sixth (6th) merchant-offer in Offer Group 106 is "Please confirm your selection of merchant-offer number six for Golf; Foursome; Tee Sheet Time is 3:15 PM; Harbor Links Golf Course, 1 Fairway Drive, Port Washington, N.Y. 11050 (516) 767-4816; Six and one half Miles; Fifteen Minutes' Drive Time; Ten percent donated to Port Washington Food Bank; Offer expires at 4:45 PM today; Tell all your golfing buddies that Harbor Links is where golf is played at its very best near New York City!"

Upon hearing the audible rendering of the request for confirmation seen at reference numeral 110, the user speaks "I confirm" as shown at reference numeral 112. The speech of audio Command 112 may be digitized and transmitted by the web enabled mobile computing device 102.

Responsive to Command 112, a confirmation is received and audibly rendered by execution of the application executed on the web enabled mobile computing device 102. The confirmation seen at reference numeral 114, which corresponds to user's selection of the sixth (6th) offer in Offer Group 106 is "A confirmation text message is now being sent for Golf, Foursome; Tee Sheet Time is 3:15 PM; Harbor Links Golf Course; located at 1 Fairway Drive, Port Washington, N.Y. 11050; Harbor Links will donate ten percent of your bill to the Port Washington Food Bank; This offer to donate expires at 4:45 PM today". Thank You!""

Note that before the merchant making the sixth (6th) offer in Offer Group 106 is obligated to make a donation to the Affinity Entity, the Port Washington Food Bank, a transaction must take place based on the conditions of the offer, e.g. between the user and the merchant not later than 4:45 PM as specified in the merchant's offer, as will be further explained below.

Figure 2:
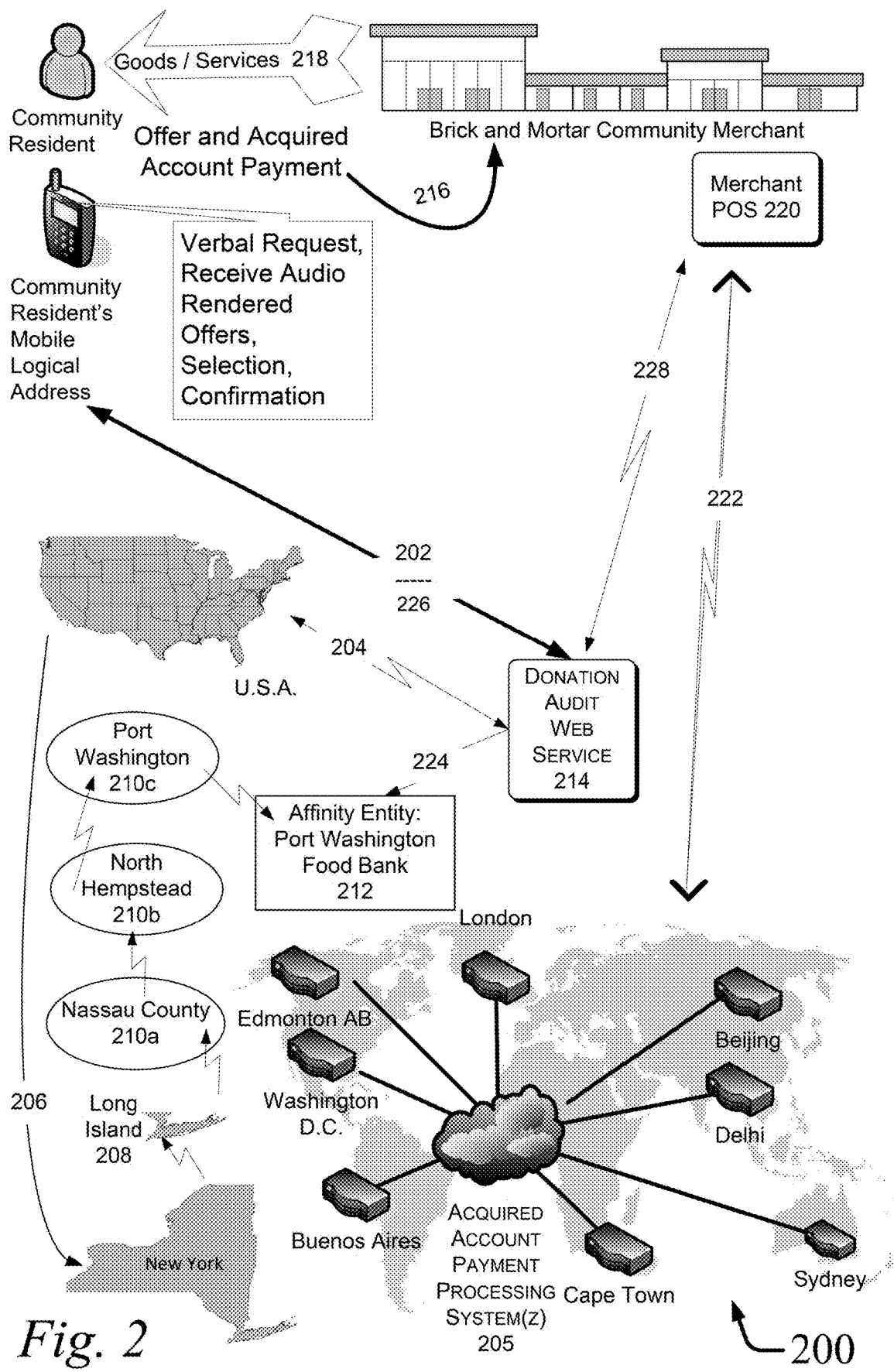
FIG. 2 is a flowchart illustrating an exemplary process that that allows a web enabled mobile computing device user to search for, find, and select an offer from a merchant, without use of the device's keyboard or display screen, where the users subsequent transaction obligates the selected merchant to make a donation to an affinity entity providing goods and/or services to a community in common to both the user and the selected merchant.

Referring now to FIG. 2, an environment 200 is depicted for a global acquired account payment processing system 205, as shown. Environment 200 includes a community resident who operates a web enabled mobile computing device that executes an application allowing the user to solicit offers from merchants having brick and mortar stores where the user resides. Each such offer responsively received via audio rendered by the web enabled mobile computing device includes terms and conditions that obligate the merchant-offeror to make a donation to a local affinity entity if the user conducts a timely financial transaction at the merchant-offeror's brick and mortar store. As such, the user, as a community resident, is incentivized to buy from the merchant's brick and mortar store by the merchant's agreement to make a donation to an affinity entity also located in and providing goods and/or services to the local community where the user resides.

By way of example, the affinity entity may be an organization that provides a good and/or service to which both community residences and merchants have an affinity—such as by their common geographic location. This affinity entity may provide food and clothing to needy families in their common community. This affinity entity may provide teaching and demonstrations of entrepreneurial skills to community's unemployed. Another affinity entity may provide venues where sports education can be provided to local competing teenagers. Yet another affinity entity may provide care and feeding to abandoned pets. The affinity entity may also cultivate good citizenship and public policy. An affinity entity may be either a for-profit or non-profit organization providing a good or a service to a local community to which both merchants and customers in the same community have an affinity, by their common location, to advance and/or promote.

At reference numeral 202 of Environment 200, a community resident operates a smart phone to request offers to play golf with a local golf course. To do so, the community resident initiates an application on the smart phone, which listens for the community resident's verbal command Responsive to the command as received by a Donation Audit Web Service 214, an Offer Group (e.g., a group of different offers from different merchants) is transmitted for audible rendering on the web enabled mobile device.

Each merchant's offer in the Offer Group may identify the affinity entity to whom the merchant-offer will make a donation. To identify the affinity entity, a customer identifier for the smart phone's user, as received by a Donation Audio Web Service 214, may look up the community where the smart phone user resides and where the merchant-offer has a brick and mortar store. Alternatively or additionally, the user's smart phone may have location detection mechanism to provide a current location of the user. The user's location may be used to generate an Offer Group of offer's close or proximate to the user's location. As shown by steps 204-212, Donation Audit Web Service 214 uses metadata included with the transmissions of the commands received from the web enabled mobile computing device to determine whether the merchant and its customer have the same local community. By way of example, meta data in the transmission can include an identifier for the customer, and a database of merchants and their respective merchant-offers can include geographic location information. This geographic location information will be matched against which the geographic location information for the residence of the user of the smart phone. Merchant and customer identifiers can be assigned to the merchant and its customer during or prior to any transaction, such as when each are registered with or otherwise sign up for participation with the Donation Audit Web Service 214. This registration process will include the collection of physical and logical addresses for each. Alternatively or additionally, merchant profiles may be associated with one or more geographic locations that may be compared to the user's current location or route to determine offers for merchants that are close or proximate to the user. As will be described herein, offers may be recommended based on attributes of the user, historical data regarding the user, and so on.

Once physical address information the merchant-offeror and its potential customer is known, the local community of each of the merchant and its customer can be determined. The local community determination can be made on any of several different methods, or combinations thereof. Once such method is political in that the merchant's place of business is determined to be in the same political or legal division as that of its customer's residence, such as the same province, state, county, prefecture, city, city-state, borough, etc. Another such comparison can be whether the merchant's place of business has a governmentally issued postal code that is the same or within a predetermined proximity as that of its customer's residence.

Yet another such comparison can be whether the merchant's place of business and its customer's residence are physically proximate within a predetermined factor by any of a variety of measures or combinations thereof. For example, latitude and longitude coordinates might be known for both the merchants place of business and the residence of its customer (or the location of the smart phone). These coordinates can be used to determine whether the linear distance there between is within a predetermined distance to ascertain whether or not the merchant and its customer share the same local community.

Alternatively, a navigation algorithm, using any of various different travel methods (e.g., walking, automobile, bicycle, mass transit, etc.), may be used to determine whether the time, using one or more travel methods, is within a predetermined time limit to ascertain whether or not the merchant and its customer share the same local community. By way of example the merchant and its customer might be determined to be within the same local community if the automobile drive time, as determined from one or more databases of contemporary cartographic road system information, to navigate between the merchant's brick and mortar store and the customer's residence is less than a predetermined time threshold (e.g., 17 minutes).

A further alternative implementation may identify the population density of both the merchant's brick and mortar store and the customer's residence. If the population density exceeds a predetermined density, then the merchant and its customer might be determined to be within the same local community if the time to walk, bicycle or take public transportation between the merchant's brick and mortar store and the customer's residence, as determined from one or more databases of contemporary topographic, mass transit, and/or pedestrian cartographic system information, is less than a predetermined time threshold (e.g., 55 minutes).

Still another such comparison can be whether the merchants place of business and its customer's residence are proximate according to voting, electoral, or political districts. The district use can be determined by an official method, an unofficial method, or a combination of method. By way of example, measurements known within the political gerrymander sciences can be used, including but not limited to a minimum district to convex polygon ratio, shortest split line algorithm, minimum isoperimetric quotient, etc.

The local community corresponding to that of the merchant and its customer, and separations there between (if any), can be determined from any combination of linear distance, mode-specific navigational transportation travel time, political separation, postal designation, and/or hybrid algorithm that takes into considers geographic barrier features such as rivers, cliffs, and highways, cultural features such as boundaries of identified people groups (e.g., tribes, first nation people, etc.), land ownership such as subdivisions, housing projects, cooperatives, planned communities, military installations, governmental owns and leased properties, etc. Given the foregoing, a community module (of e.g. donation utility 26 of FIG. 10) might determine that the merchant and its customer are members of the same community, not members of the same community, or are both members of more than one of the same communities as determined by the algorithm.

Figure 11:
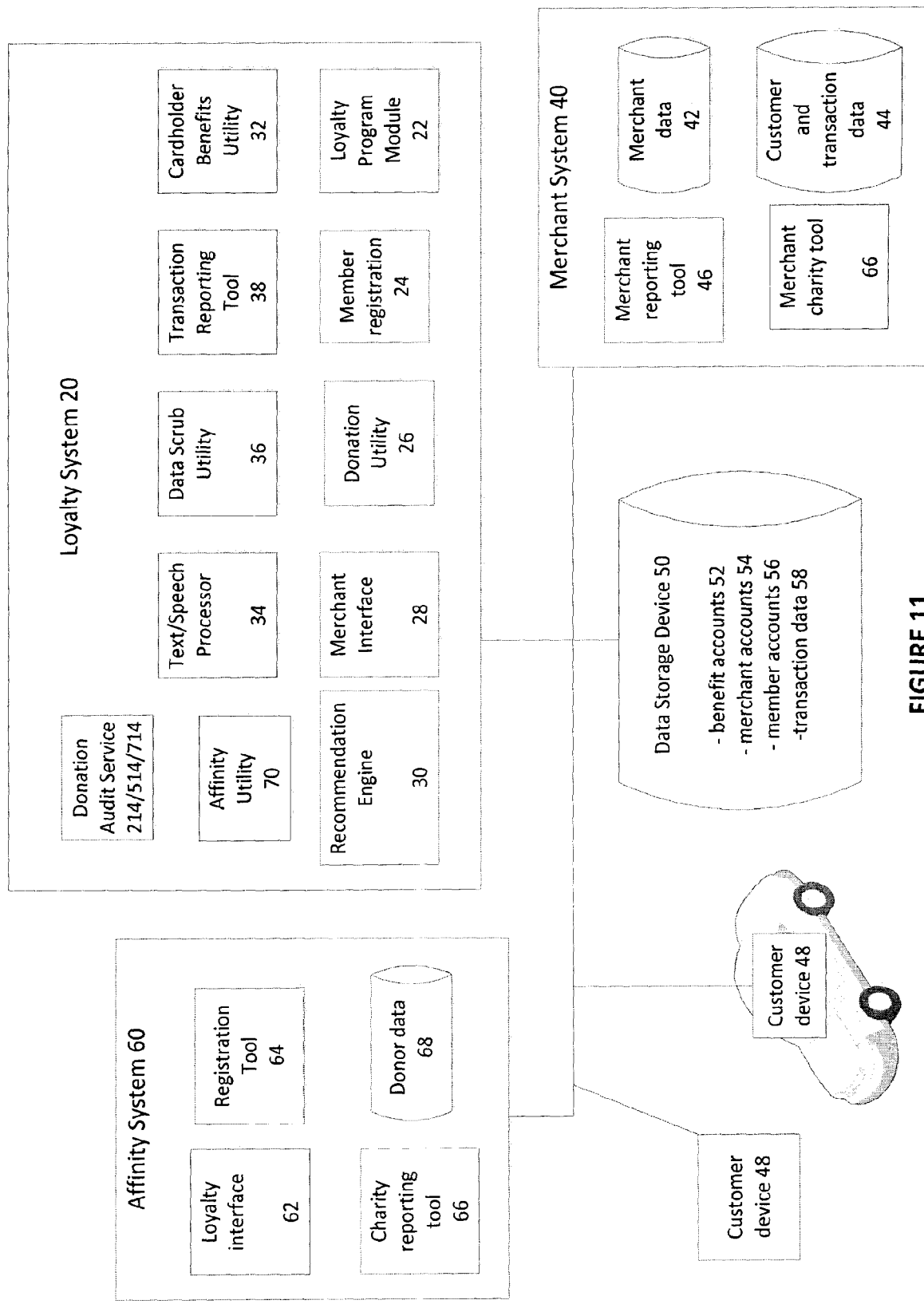
Figure 12:
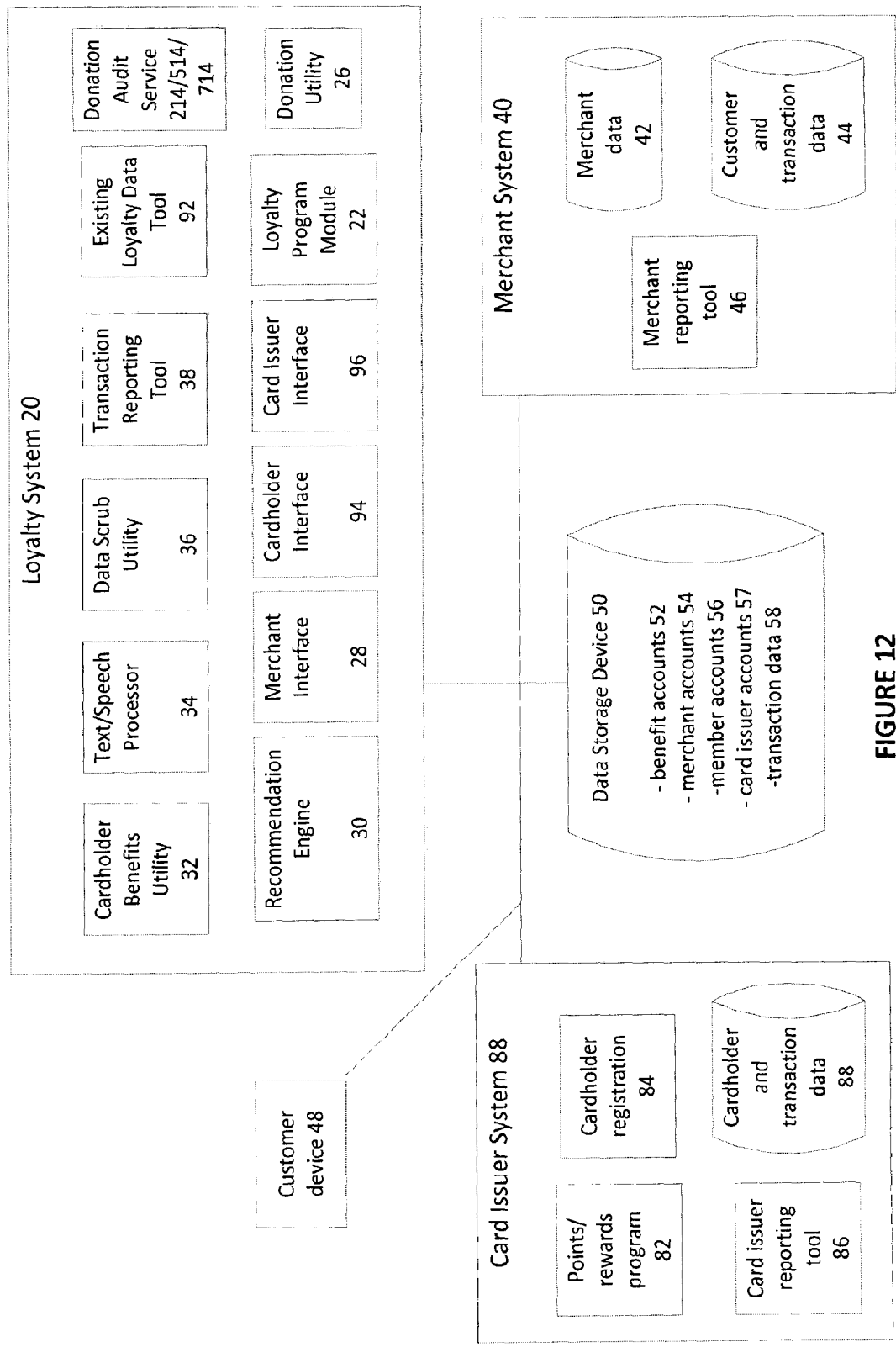
Figure 13:
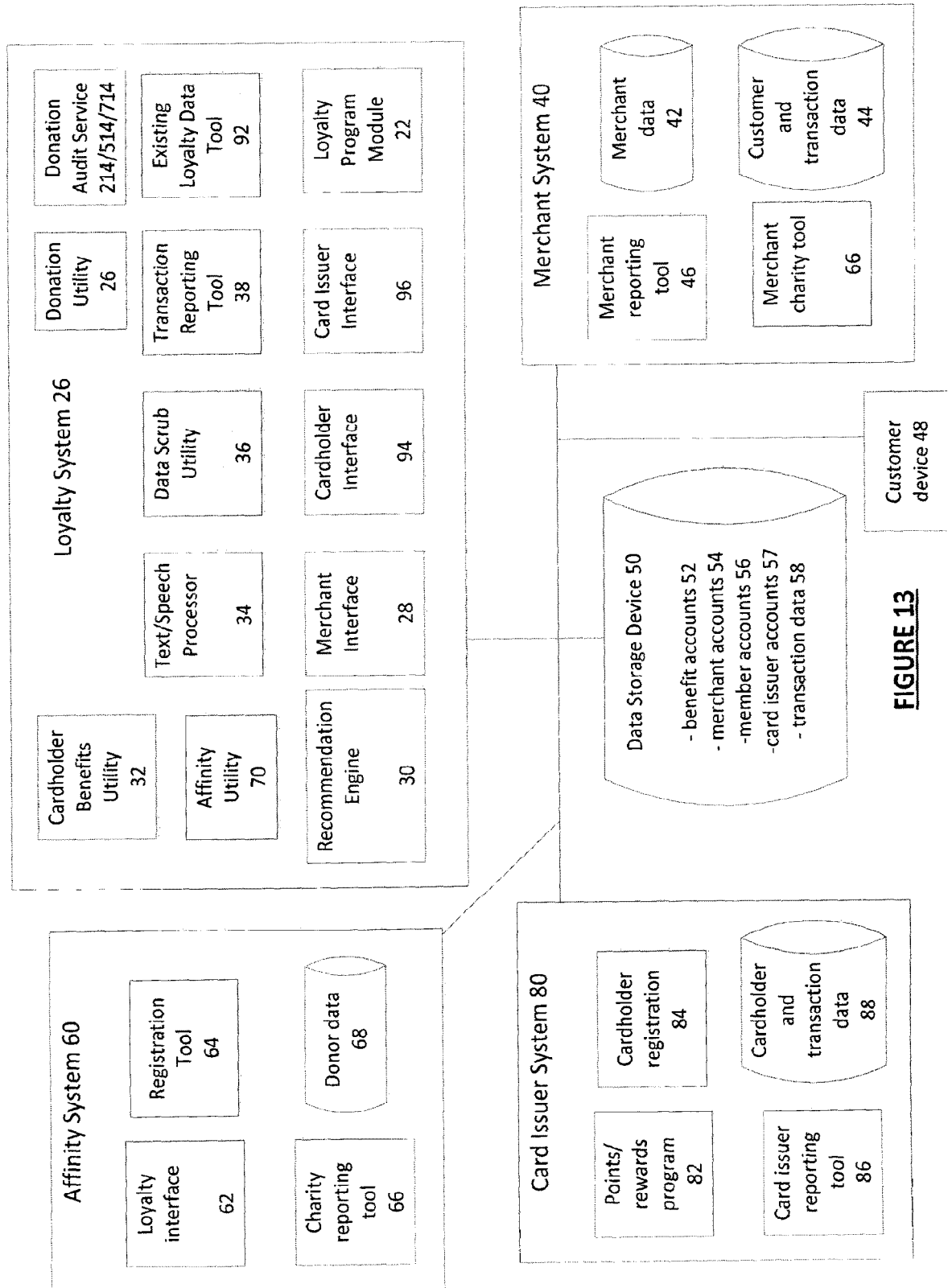

Similar or different techniques may be used to determine the respective local community of the merchant and its customer can also be used to determine the local community of an affinity entity such as that shown on FIG. 2 at reference numeral 224, or as that shown as an Affinity Entity (k) 596 in FIG. 5, or as shown by Affinity Entity (k) 796 in FIG. 7, each of which is discussed herein below. An Affinity Entity may be associated with an affinity system 60 (FIG. 11) to connect to system 200.

If the local community of the merchant, its customer, and an affinity entity that has been selected by the customer are the same, then the business rule selected by the merchant may determine the amount of the donation that the merchant will make to the affinity entity selected the customer. In some implementations, the affinity entity to whom a merchant is to make a donation may only be selected by the customer, and not the merchant. In such implementations, tensions between the goals or purposed of an affinity entity, if any, between merchant and customer may be reduced by allowing the identity of the affinity entity to be unknown to the merchant while being selected by the customer. As such, the merchant may need not be told or be given any notice, directly or indirectly, as to the identity of the affinity, entity selected the customer with whom the merchant is conducting a transaction. Rather, the merchant may be told or be given notice to make a single payment of, or period payments to, a single affinity entity that may thereafter make respective disbursements for all registered merchants accordingly to those affinity entities that had been selected by those customers with whom those merchants had conducted transactions. A merchant who, by force of reason or conscience, does not want to make a donation to a particular affinity entity need not do so directly, as any and all merchant donations are made blindly through the single affinity entity that make all disbursements to all affinity entities (via e.g. affinity system 60 of FIG. 11). Accordingly, each merchant may have notice of its total periodic donations without knowing the identity of the intended recipients, thereby leaving direction of donations fully within the discretion of the merchant's customers, limited only by the restriction that the merchant's donation must be made to an affinity entity serving the local community of both the merchant and its customer, while leaving the actual amount of the merchant's donation fully within the discretion of the merchant.

Referring again to FIG. 2, Donation Audit Web Service 214 may use respective identifiers for the merchant and its customer to access and retrieve geographic information for each, then applies an algorithm to the retrieved geographic information to determine the respective local communities of the merchant and its customer, as discussed above. Alternatively or additionally, Donation Audit Web Service 214 may obtain a current location for a user via location detection module on the user's smart phone (e.g. GPS, Wi-Fi, satellite, etc.). As shown in FIG. 2, the local community may be progressively granular in nature, such as first the United States of America as shown at reference numeral 204, then the state of New York as shown at reference numeral 206, then the portion of New York called "Long Island" as shown at reference numeral 208, then the county of Nassau shown at reference numeral 210*a*, then a portion of the Nassau County called North Hempstead as shown at reference numeral 210*b*, and then the specific geographic location of "Port Washington" as shown at reference numeral 210*c*. This final level of geographic granularity indicates a community in which both merchant and customer are members, neighbors, residents, and/or the like.

The final level of geographic granularity may be used to perform a look-up against one or more databases to which Donation Audit Web Service 214 has access. This access and lookup may be used by Donation Audit Web Service 214 to identify: (i) the affinity entity or charity for that community which, as shown at reference numeral 212, is the Port Washington Food Bank, has been specified by the customer; and (ii) the respective identifier of the merchant's business rule (and/or the customer's business rule) that is to be used to make a calculation of the donation that the merchant to make to the affinity entity or charity for that community. The business rule(s) that may be used with the currency amount of the customers payment to calculate the donation that is to be made by the merchant to the affinity entity or charity for that community. Note that the donation may be directed to a plurality of affinity entities for the local community according to directions that had been previously specified by the customer (and distributed via affinity system 60 of FIG. 11). For example, the customer may have specified that each merchant donation is to be split evenly, or in specified portions, between five (5) local community affinity entities, for example: (i) a local youth sports team cooperative; (ii) a local charter junior high school; (iii) a local house of worship; (iv) a local political party; and (v) a local for-profit college specializing business entrepreneurialism.

Given the foregoing, an affinity entity may be assigned to each merchant-offer in the Offer Group made by each merchant. The Offer Group may also be generated based on one or more recommendations from e.g. recommendation engine 30 (FIG. 10) based on user attributes, historical data regarding user, merchant trends (e.g. off-peak time, slow sales) and so on.

After the Offer Group has been assembled by Donation Audit Web Service 214, it may be converted to speech (by e.g. text/speech processor 34 of FIG. 10) and transmitted for delivery to, and audible rendering by, the community resident's smart phone. Responsive to the Offer Group audibly rendered on the web enabled mobile device, the community resident speaks a choice of an offer from among the merchant-offers in the Offer Group. This spoken choice is digitized and transmitted for receipt and speech-to-text conversion by Donation Audit Web Service 214 and text/speech processor 34.

Responsive to the spoken choice selection as received by a Donation Audit Web Service 214, a request for confirmation of the selected offer may be converted to an audible digital file that is transmitted for audible rendering on the web enabled mobile device. Responsive to the request for confirmation as audibly rendered on the web enabled mobile device, the community resident may speak a confirmation. This spoken confirmation is digitized and transmitted for receipt and speech-to-text conversion by Donation Audit Web Service 214 and text/speech processor 34.

Responsive to the confirmation as received by Donation Audit Web Service 214, an acknowledge of receipt of the confirmation may be converted to an audible digital file that may be transmitted for audible rendering on the web enabled mobile device, which may be followed by a corresponding text message sent by Donation Audit Web Service 214 to logical address corresponding to the Community Resident's smart phone. The text message may contain a summary and/or further detail of the confirmed selection of the offer from the local merchant to the local customer.

At step 216, the community resident takes the accepted selected local merchant's conditional offer to the local merchant's brick and mortar store. After showing the offer to the merchant, the community resident conducts a transaction on an account issued by an issuer to the community resident to pay of the transaction and buy goods and/services 218 received by the community resident.

Note that terms and conditions of the transaction may differ from that of the offer presented by the community resident at the local merchant's brick and mortar store. As such, the merchant's offer to donate may not be specific to a particular good or service, but rather may be specific to the entire transaction between the merchant and its customer. By way of example as to this type of offer specificity, the offer may obligate the merchant to make a donation of a certain percentage of the entire currency amount of transaction, or the offer may obligate the merchant to make a donation only if the transaction is conducted at a certain time of day or on a particular day of the week, or a combination of the foregoing. Although some terms of the offer may differ from some terms of the subsequent transaction between the merchant and its customer, nevertheless, the merchant's offer to make a donation to a local affinity entity (e.g., a local charity) fundamentally provided an incentive that caused, at least in part, the local community resident to navigate to the local merchant's brick and mortar store, come into the store, and ultimately conduct a transaction that brought revenue to the local merchant. Advantageously, the absence of specificity in the offer as to a particular good or service allow many implementations to operate without modification to the merchant's input of data about the transaction at a Point of Service terminal (POS) seen at reference numeral 220, without modifications to the POS 220 itself, and without modifications to software executing on POS 220.

The merchant inputs data about the transaction into a Point of Service terminal (POS) seen at reference numeral 220. The POS, for example, can be a cash register or a web enable mobile device (e.g., a tablet computing device). The POS may be integrally part of a merchant computing system 40 (FIG. 10) or connected thereto. The POS 220 transmits the input data to an Acquired Account Payment Processing System (z) 105. The Acquired Account Payment Processing System (z) 105 sends a signal, as shown at reference numeral 222, to Donation Audit Web Service 214 indicating that a transaction on the community resident's account was approved for being conducted by the community resident with the merchant whose offer was selected by the community residence. Optionally, the data input into POS 210 can include additional monies received from the customer by the merchant that are also to be donated, via the merchant, to the affinity entity or charity for that community. Upon receipt of the signal, a donation to the community affinity entity by the user's selected merchant may be calculated according terms and conditions specified by the merchant.

The Donation Audit Web Service 214 may retain the derived donation for subsequent audit purposes to insure compliance by each community merchant in its donation commitments to each of the one or more affinity entities or charities for each community that the merchant and/or its customers is a member. The Donation Audit Web Service 214 also may transmit a message containing notice of a donation, or the particularly derived donation, for the customer's transaction, as shown at reference numerals 224, 226, and 228, respectively to logical addresses of the affinity entity or charity for that community, the community resident and the merchant.

Figure 5:
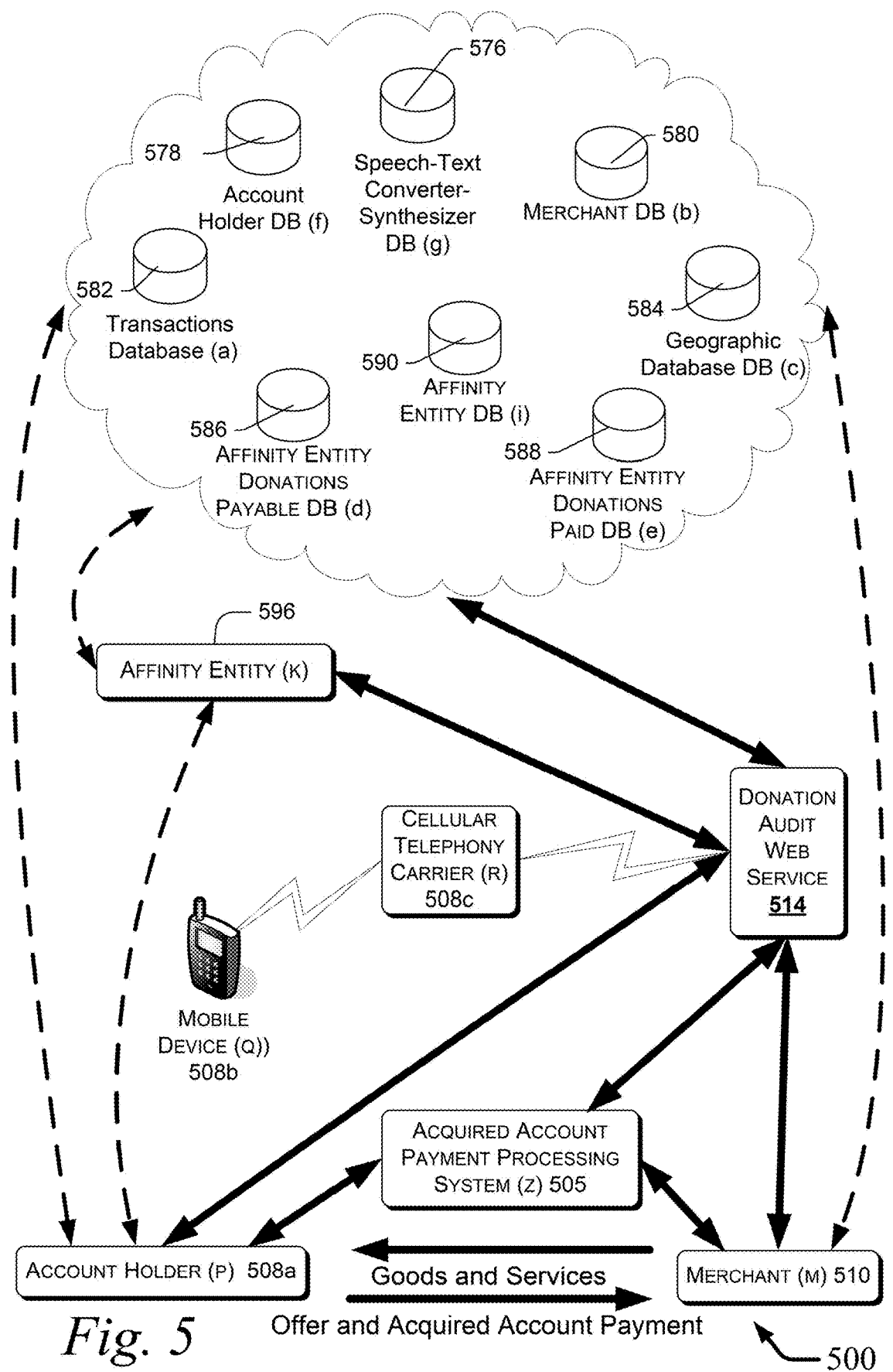
FIG. 5 illustrates an exemplary system in which the processes of FIGS. 2, 4 and 6 may be performed by use of and access to an acquired account payment processing system, where the system provides functionality for processing transactions conducted by merchants with customers, wherein, for each transaction, there is a provision of a service or good by the merchant to the customer for the transaction, where the customer pays for the service or good by conducting a transaction on an account issued to the customer, and there is an affinity entity to which a contribution is made by the merchant as a condition of the transaction.

Referring now to FIGS. 3a-3b and 5, a screen shot 302 features input and displays fields by which a Merchant (m) 510, or agent thereof, can input terms and conditions under which the Merchant (m) 510 is willing to become obligated to make a donation to an Affinity Entity (k) 596. Each row in screen shot 302 represent all or a portion of twenty-four (24) hour day of the 356 calendar days of one (1) year. Columns in each row of the table seen in screen shot 302 are, from left to right, as follows: 1st: the numerical calendar day of the year; 2nd-3rd: the hyphenated starting and ending of a time period within the calendar day; 4th: a percentage of a currency amount of any one (1) transaction that the Merchant (m) 510 may commit to make to an Affinity Entity (k) 596; 5th: the minimum currency amount of the transaction before the commitment by the Merchant (m) 510 to make the donation will arise; 6th: the maximum amount of donation that the Merchant (m) 510 may be willing to make for any one (1) transaction; and 7th: an identifier for the Affinity Entity (k) 596 to whom the Merchant (m) 510 may make the donation as described in the row.

The bottom of screen shot 302 allows specification inputs for the Merchant (m) 510 as to its maximum donation across all Affinity Entities 596 for any one day, month, quarter of a year, or year.

By way of example, and not by way of limitation, the data input by the Merchant (m) 510, or agent thereof, for display on screen shot 302 may obligate a donation to be made to an affinity entity that is higher at some days and times of the calendar year, and lower at other days and times of the calendar year. As such, it may be advantageous for the Merchant (m) 510 to provide a higher donation incentive for typical slow business calendar days and a lower donation incentive for typically busier business calendar days. These are examples of merchant trends that me be used to generate or recommend offers or incentives for Offer Group.

Data input in the user interface depicted by screen shot 302 may be stored in one or more of the Merchant DBs 580, data storage device 50 (FIG. 10) or other location logically accessible, via one or more networks or otherwise, to Donation Audit Web Service 514. These data can also be automatically pre-loaded for Merchant (m) 510 via an automatic initiating service (e.g., an data auto-boarding operation) that allows the Merchant (m) 510 to be automatically entered as a participant in a local community charitable donation program that is incentivizes increased local resident foot traffic each store location of the Merchant (m) 510 in the local community.

As seen in FIG. 3a, each offer input by the merchant to make a donation to a local affinity entity is not be specific to a particular good or service that the merchant will provide to its customer in a transaction. Rather, the offer is specific to the entire transaction between the merchant and its customer. By way of example as to this type of offer specificity, the offer may obligate the merchant to make a donation of a certain percentage of the entire currency amount of transaction, or the offer may obligate the merchant to make a donation only if the transaction is conducted at a certain time of day or on a particular day of the week, or a combination of the foregoing. Although some terms of the offer may differ from some terms of the transaction, nevertheless, the merchant's offer to make a donation to a local affinity entity (e.g., a local charity) has the goal of fundamentally providing an incentive that causes, at least in part, the local community resident to navigate to the local merchant's brick and mortar store as new foot traffic, and ultimately to conduct a transaction that brings revenue to the brick and mortar store of the local merchant.

Referring now to FIG. 3b, a screen shot 304 features input and displays fields by which an Account Holder (p) 508, or agent thereof, can direct a third party donor, such as a Merchant (m) 510 with whom the Account Holder (p) 508 is conducting a transaction, to be obligated to make a donation to an Affinity Entity (k) 596. The fields provided by screen shot 302 allow the customer to specify one or more affinity entities in their local community to which donations are to be made by merchants with whom the customer conducts transactions. In such implementations, each merchant is given notice of its total periodic donations. Such notice, however, can optionally be given without providing the merchant with any notice or knowledge as to the specific identity of those affinity entities that are to be the recipients of its donations. The donation mechanism can be set up such that the merchant makes blind donations, either directly or indirectly, to affinity entities in the local community of both the merchant and its customer who selects those local community affinity entities. Accordingly, the donation mechanism may leave direction of merchant's donations fully within the discretion of the merchant's customers, limited only by the restriction that the customer can only select from among those affinity entities that serve the local community that is in common to both the merchant and the customer, while leaving the actual amount of the merchant's donation fully within the discretion of the merchant as shown in FIG. 3a.

Optionally, a further limitation on those local community affinity entities that may be selected by the customer may include control logic that accesses a rating, and/or that derives a rating, for an affinity entity. The control logic may use one or more ratings given by one or more charity rating organizations, where the control logic result is used to determine whether or not the affinity entity is eligible for participation in the implementation as a registered affinity entity that is selectable by local community customers. This may be used by recommendation module 30 (FIG. 10) to generate the Offer Group and the affinity entities associated with the various merchants and offers. The ratings may be retrieved by Donation Web Service 214 by its access to one or more databases (e.g. data storage device 50 of FIG. 10) where such ratings are input and maintained. Example of charity rating organizations which provide one or more ratings that could be used for various disclosed implementations include Guide Star, Charity Navigator, Give Well, Evangelical Council for Financial Accountability (ECFA), the Better Business Bureau Wise Giving Alliance Standards for Charity Accountability of the Council of Better Business Bureaus, Inc., and the like that now exist or may exist in the further. Moreover, other mechanisms for assessing local community affinity entities may be used to determine whether or not affinity entities are eligible for participation in the disclosed implementations as registered affinity entities that are selectable by local community customers and/or local merchants.

Each row in screen shot 304 of FIG. 3*b* may represent a different Affinity Entity (k) 596 in the local community of the customer for which there is a specific code (e.g., 999(i)(j), Community Identifier (e.g., ZZZ999), and Affinity Name as shown in FIG. 3*b*. A pull down menu of selectable affinity entities (not shown) can be used to provide selectable input to the fields corresponding to affinity entities shown on screen shot 304.

By way of example, the Affinity Entity and/or the Community ID might identify a specific Affinity Entity (k) 596 that is located in, and provide goods and services to, the borough of Greenwich Village at the southern portion of the geographical island of Manhattan in the city of New York of the State of New York, in the USA. By way of example, and not by way of limitation, the Affinity Entity Code 105(064)(q2e) could have an interpretation where '105' represents the United States of America, the index '064' represents the state of New York, "q" represents the City of New York, "2" represents the combined boroughs of Manhattan, and "e" represents the borough of Greenwich Village at the southern portion of the geographical island of Manhattan in the city of New York of the State of New York. The name of the specific Affinity Entity (k) 596 represented the code 105 (064) (q2e) can be the Washington Square Food Bank, which may be located in, and provide goods and services to, the borough of Greenwich Village at the southern portion of the geographical island of Manhattan in the city of New York of the State of New York, in the USA. Note that the Account Holder (p) 508 can use screen shot 302 to specify multiple community IDs each representing a geographic location where the Account Holder (p) 508 either has a residence or operates a business in the geographic location. Also note that, for each such community ID specified by the Account Holder (p) 508, the second column of the rows of screen shot 304 in FIG. 3*b* may add up to 100%, thereby provide a percentage the donation made by the Merchant (m) 510 with whom the Account Holder (p) 508 conducting a transaction.

Figure 10:
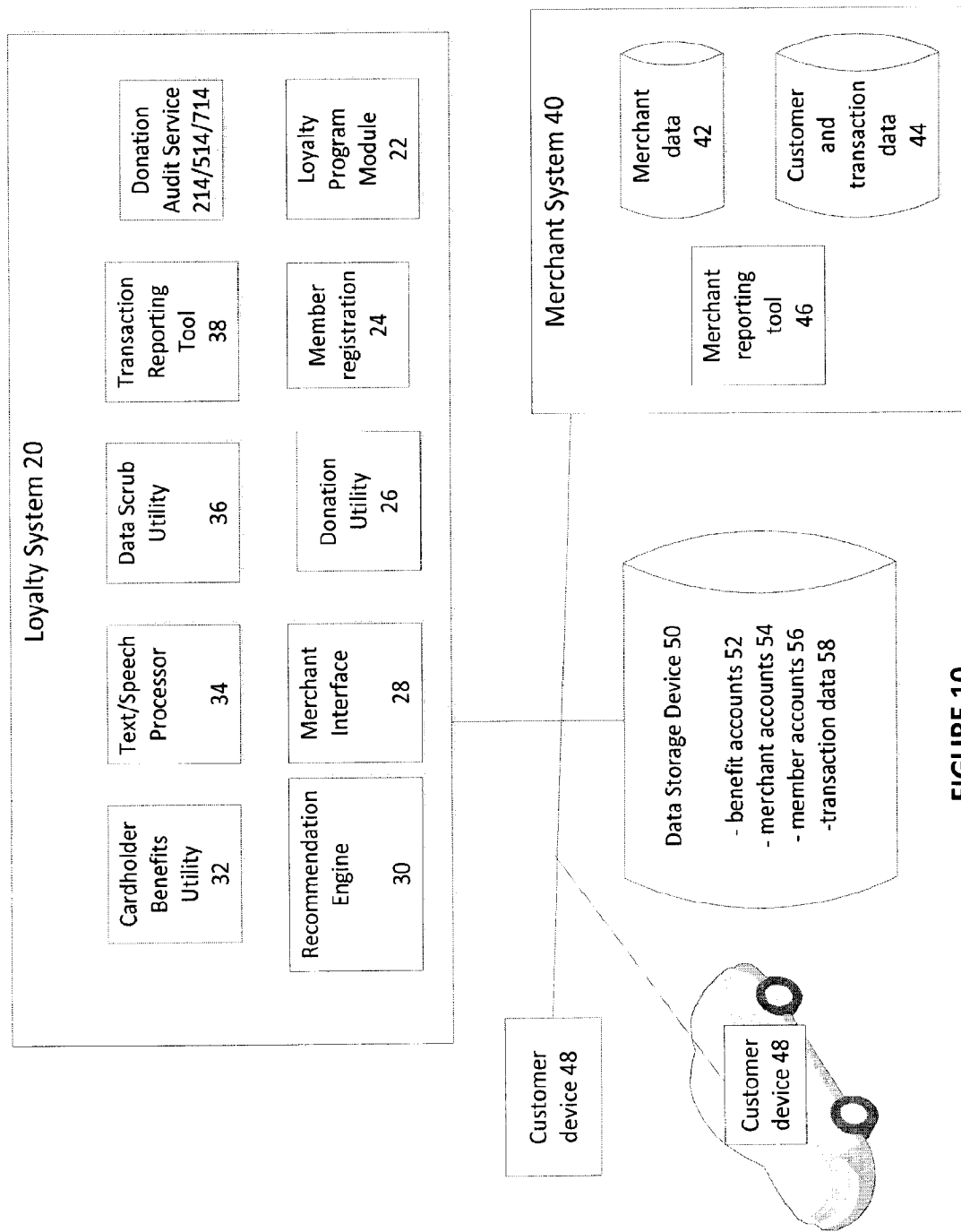
FIGS. 10 to 13 illustrates other exemplary systems in which the processes of FIGS. 2, 4 and 6 may be performed by use of and access to an acquired account payment processing system.

For screen shots 302-304, input and selection of data for each Affinity Entity may be via a typical user experience including but not limited to keyboard data entry, pull down menus, pictograph optical scanning with a cellular telephony device as read from print or electronic media rendering, etc. Horizontal 318 and vertical 320 panning can be user activated to move that portion of the display being rendered horizontally and vertically, respectively. The data may be stored in data storage device 50 (FIG. 10)

The Account Holder (p) 508 and the Merchant (m) 510 may change or disable a donation commitment at any time by accessing a server that serves web pages rendering screen shots 302, 304, respectively. Thus, charitable donation commitments can be easily and instantly, and both enabled or disabled, using the real time user interface. By way of example, and not by way of limitation, one or more of such servers may be hosted by the Donation Audit Web Service 514 seen in FIG. 5.

Referring now to FIGS. 4-5, a Method 400 is illustrated by the flowchart shown in FIG. 4. Reference may also be made to FIGS. 10 to 13 and system components thereof which may be used to implement Method 400. Method 400 may allow a web enabled mobile computing device user to search for, find, and select an offer from a merchant. The user interface provided by the mobile device includes an audio transreceiver. As such, the user of the mobile device can operate most, if not all, of the user interface without use of the device's keyboard or display screen to search for, find, and select an offer from a merchant. The user's subsequent transaction with the selected merchant-offeror obligates the selected merchant, by terms specified in the offer, to make an audited donation to an affinity entity that providing goods and/or services to a community in common to both the user and the selected merchant.

At step 402 Method 400, a user initiates execution of an application on the mobile device (e.g. customer device 48 of FIG. 10), and then speaks one or more keywords likely to occur in an offer from a merchant. The keywords may represent desired attributes of an offer, good, service, merchant, affinity entity, and so on. The application stores a digital version of the user's speech and then transmits the digital version for receipt by a Donation Audit Web Service 214, (or 514 of FIG. 5). The digital version may be provided to text/speech processor 34 for converting speech utterances to text commands. Also transmitted with the digital version may be identifiers for the current geographic location of the mobile device as derived from the device's geo-location functionalities, for example, and identifiers for the customer or user of the mobile device sufficient to identify a customer who had previously registered as a customer with the Donation Audit Web Service 214/514.

At step 404 of Method 400, the transmission from the mobile device is received by the Donation Audit Web Service 514. One or more databases are accessed in order to look up information pertaining to the registered customer who is asking for offer(s) by using the mobile device. Here, the customer identifier received from the mobile device may be used to look up customer information in one or more databases Account Holder DBs 578 of FIG. 5 or data storage device 50 of FIG. 10. The information that is looked up for the customer includes the residential community of the customer. Also at step 404 of Method 400, one or more Merchant DBs 580 seen in FIG. 5 can be accessed to determine the merchants that have brick and mortar store locations in the residential community of the customer who is asking for offers.

A Speech-To-Text Conversion (S2T) operation in performed on the digital file at step 404 of Method 400 by e.g. text/speech processor 34 (FIG. 10). The S2T operation derives the one or more keywords that were spoken as utterances by the mobile device user. The derivation of the one or more keywords can be performed in conjunction with information located by accessing one or more databases, such as Speech-Text Converter-Synthesizer DBs 576 of FIG. 5 (which may be persistently stored at data storage device 50 of FIG. 10). The derived one or more keywords may be used to look up offers from merchants, or recommend offers. The merchant offers may be found by accessing one or more databases (which may be persistently stored at data storage device 50 of FIG. 10), where offers containing matches of the one or more of the keywords are located in the one or more databases (which may be persistently stored at data storage device 50 of FIG. 10). By way of example, such offers can be stored in Merchant DBs 580 of in FIG. 5 (which may be persistently stored at data storage device 50 of FIG. 10). Alternatively, for each such offer that contains one or more matching keywords, the geographic address of the brick and mortar address store for the merchant is also retrieved if not already retrieved.

The information retrieved from Merchant DBs 580 and Account Holder DBs 578 (at data storage device 50 of FIG. 10) may be used to derive: (i) a first (1st) set of Merchants having brick and mortar store locations in the residential community of the customer who is asking for offers; (ii) a second (2nd) set of Merchants from the 1st set of Merchants whose correspondingly retrieved information from Merchant DB s 580 show that their Merchant Commodity Code (MCC) or other attribute pertaining to the goods and/or services provided by the merchant matches that of the one or more keywords spoken by the user to the mobile device; and (iii) a third (3rd) set of Merchants from the 2nd set of Merchants whose offers have not yet expired, where each such offer includes an obligation to make a donation to an Affinity Entity the provides goods and/or services to the customer's Residential Community. Note that the Affinity Entity of the customer's residential community for each offer can be identified by matching information retrieved by access to one or more databases in Affinity Entity DBs 590, in Merchant DBs 580, and in Account Holder DBs 578.

For each offer by each Merchant in the 3rd set as identified in step 404 of Method 400, navigation (distance/time) calculations are made by using (i) identifiers for the current geographic location of the mobile device as derived from the device's geo-location functionalities; and (ii) information retrieved by access of one or more databases Geographic Database DBs 584 which may contain cartographic map data for navigating by walking, bicycling, automobile, and/or public transportation. Each such calculation may derive the distance between the present location of the mobile device and the merchant making the offer, and may also or alternatively derive the time for the customer to navigate to the merchant by as to navigate by walking, bicycling, automobile, and public transportation.

At step 406 in Method 400, for each offer from each Merchant the third set, a Text-To-Speech conversion is made, in conjunction with information retrieved by access to Speech-Text Converter-Synthesizer DBs 576 seen in FIG. 5. The conversion is made for each offer in order to create an audio file of synthesized speech that includes: (i) a Merchant Identifier (Name/Location/Keyword); (ii) the calculated Navigation (distance/time) by walking, bicycling, automobile, and/or public transportation; (iii) a description of the unexpired offer to make a donation to an Affinity Entity in the customer's residential community; (iv) optionally, other unexpired offers such as an advertisement about a good and/or service being offered by the merchant; and (v) terms and conditions of the offer(s) from the merchant in the 3rd set of merchant. Accordingly, the audio file of synthesized speech contains one or more verbally expresses unexpired offers from merchants in the third set of merchants to customers living in a community where each such merchant has a brick and mortar store of location where the merchant's unexpired offer can be accepted by a resident of the local community. The audio file of synthesized speech created in step 406 is transmitted to a logical address of the customer's mobile device for audio rendering.

Note that the order in which the offers are presented with the audio file of synthesized speech created in step 406 can be sorted in various ways for presentation to a requesting user. By way of example, the offers can be presented in order from lowest to highest, or vice versa, by: (i) the calculated navigation time of travel, by mode of transportation, from the mobile device's (e.g. customer device 48 of FIG. 10) current geographic location to the merchant's community brick and mortar store; (ii) the date and time on which the merchant's offer will expire; (iii) the donation factor that will be used to calculate the merchant's obligatory donation to an Affinity Entity corresponding to the customer's residential community (e.g. a percentage of the currency amount of the transaction); (iv) the number of past transactions that have been conducted by the customer with the merchant-offeror in the 3rd set of Merchant; and (v) etc. Note that past transaction data between the customer and the merchant-offeror in the third set of Merchant can be retrieved by Donation Audit Web Service 514 accessing to one or more Transaction Databases 582 seen in FIG. 5. The past transaction data may be used to generate the Offer Group, based on historical transaction and preferences of the user for example.

At step 408 of Method 400, the mobile device receives and renders the audio file of synthesized speech by execution of an application. In response to the rendered audio, the user speaks words corresponding to a selection of one of the offers in the rendered audio file. A digitized file containing the user spoken words that identify the user's selected offer is transmitted to the Donation Audit Web Service 514.

At step 410 of Method 400, the digitized file is received by the Donation Audit Web Service 514. As described above for other speech-to-text operations, a Speech-To-Text Conversion operation is performed (by e.g. text/speech processor 34) to derive a textual version of the user's speech that contains the selected offer from the merchant in the 3rd set of Merchants. As described above for other text-to-speech operations, a Text-To-Speech Conversion operation is performed to synthesize an audio file containing a request to confirm the user's selected offer from a merchant in the 3rd set of Merchants. This synthesized audio file in transmitted to the logical address of the user's mobile device where it will be rendered by execution of an application.

At step 412 of Method 400, the mobile device (e.g. Customer Device 28 of FIG. 10) receives and renders the audio file of synthesized speech by execution of an application. In response to the rendered audio, the user speaks words making the requested confirmation of the user's previously selected offer from the merchant in the third set of Merchants. As described above, the user's spoken words are digitized into a file that is transmitted from the mobile device for delivery to the Donation Audit Web Service 514.

At step 414 of Method 400, the digitized file is received by the Donation Audit Web Service 514. As described above for other speech-to-text operations, a Speech-To-Text Conversion operation is performed (by e.g. text/speech processor 34) to derive a textual version of the user's speech that confirms the user's previously selected offer from the merchant in the 3rd set of Merchants. This textual version is compared with expected text to ensure that the user has confirmed selection of the prior selected offer. Otherwise, the above steps are repeated until a user's selected offer is confirmed by the user.

Once the user's confirmation of a selected offer is obtained as described above, a transmission of information may be made to a logical address of corresponding the merchant. The transmitted information may include: (i) an identifier for the registered customer who is accepting the merchant's offer; (ii) the calculated distance and/or time for the customer to navigate from the present location of the mobile device to the merchant's brick and mortar store by walking, bicycling, automobile and/or mass transit; (iii) the terms and conditions of the offer including any expiration thereof; (iv) optionally any other information already conveyed Method 400 to the customer, such as a statement about the donation that the merchant will make to the community Affinity Entity when the customer conduits a timely transaction with merchant; and (v) other unexpired offers or advertisements that may or may not have been conveyed to the user for audible rendering on the user's mobile device, terms and conditions of such other offer(s), etc.

After steps 402 through 414, some mobile device users may decide not to navigate to the merchant's brick and mortar store in their residential community to accept their previously selected offer from that merchant. Others, however, may navigate to the merchant's store and go inside to shop. A group of the latter will each conduct a transaction with the merchant in a time fame that is within the period specified in the merchants' offer that was selected by the user of the mobile device. An order for the good or service may be made automatically and remotely from the mobile phone of the user. For example, the selected offer may relate to purchasing a pizza and the order for the pizza may be made automatically via an application on the mobile phone of the user upon selecting the offer. Payment for the transaction may occur using the mobile phone or at the time of pick up.

Method 400 receives information that confirms such a timely transaction between the customer and the merchant at step 416 by way of receiving information derived from an authorization response for the transaction. As more fully described herein with respect to FIG. 7, the information in the authorization response may be typically generated by an Issuer (j) 704 who issued an account to the Account Holder (p) 708 (e.g., the customer or mobile device user) on which the timely transaction with the Merchant (m) 710 was conducted. A positive authorization response reflects the Issuer (j) 704's approval of the transaction on the account issued to Account Holder (p) 708.

As shown in FIG. 5, Donation Audit Web Service 514 receives the information that was derived from the authorization response from Acquired Account Payment Processing System (z) 105, where each of the Issuer (j) 704, the Account Holder (p) 708, and the Merchant (m) 710 operate in Acquired Account Payment Processing System (z) 105.

Once confirmation has been received by Donation Audit Web Service 514 that a timely transaction has taken place been the merchant in the 3rd set of Merchant who made the offer and the customer who selected and confirmed that offer, Method 400 moves to step 418 where a calculation is made of an amount of a donation that is to be made by the merchant-offeror according to terms of the offer. By way of example, the terms of the offer to make the donation to the community Affinity Entity may have been previously input for storage in Merchant DBs 580 (at data storage device 50 or merchant system 40) by way of the merchant's user interface provided by an application executing on a computing device, such as in conjunction with a screen shot 302 seen in FIG. 3a as described above. To give notice of the donation obligation that now has arisen, the calculated donation can be sent in one or more transmissions from Donation Audit Web Service 514 to one or more logical addresses such as: (i) the Merchant in the third set who transacted with the customer; (ii) the Affinity Entity corresponding to the Residential Community. Optionally, information that identifies the Affinity Entity; and/or (iii) the Customer can be included in any such transmission.

Where the Affinity Entity to which the merchant is to obligated by the timely transaction to make a donation is specified by the customer, (e.g., such as by use of a user interface having a screen shot 304 seen in FIG. 3b as described above), the identity of the Affinity Entity need not be communicated to the merchant. Rather, the merchant can make a blind donation of the calculated amount to a third party for distribution to the Affinity Entity in the customer's residential community. By such blind, albeit obligatory, donations, conflicts and disagreements between customer and merchant as to right and proper objects of charity to the community can be avoided. As such, the customer may transact with community merchants by way of incentives from the community merchants that they will donate to the customer's favorite community charity (e.g., Affinity Entity), though the charity may not be the merchant's favorite charity, or even a desirable charity, in that community. Nevertheless, the merchant has received the benefit of a first set of customers' foot traffic inside the local brick and mortar store, as well as the benefit of a sub-set of the first set of customers that also conduct a transaction with the merchant, where each such benefit is realized by the merchant's offer to make a donation to the customer's favorite local charity(ies) if a timely transaction occurs subsequent to the offer.

As shown in step 420 of Method 400, after a predetermined audit time period, an audit can be made between calculated donations to community Affinity Entities that have been paid by the merchant and that are as-yet still unpaid. Notice regarding any calculations of the as-yet unpaid donations may be transmitted by the Donation Audit Web Service 514 to one or more logical addresses such as: (i) the Merchant in the 3rd set who transacted with the customer and has outstanding donations to community Affinity Entity(ies) in arrears; (ii) the Affinity Entity corresponding to the Residential Community to whom the merchant has outstanding donation(s) payable, and optionally information that identifies the Affinity Entity; and/or (iii) the Customer to whom the merchant made the obligation to make the community Affinity Entity donation(s).

Referring now to FIG. 5, by way of explanation for the nomenclature of reference numerals used and described in the specification, a lower case letter in parenthesis is intended to mean an integer variable having a value from 1 to the capital case of the lower case letter, which value can be large (i.e., approaching infinity). Thus '(b)' is intended to mean that the integer 'b' can have a value from 1 to B, and '(c)' is intended to mean that the integer 'c' can have a value from 1 to C, etc. As such, drawing elements 505, 508a-c, 510, 576-590 and 596 in FIG. 5 are illustrated with a block, but indicate that one or more elements can be present. For example, Affinity Entity (k) 596 is one of a possible plurality of affinity entities, where k may range from 1 to a large integer 'K'.

The diagram of FIG. 5 depicts an exemplary environment 500 for operation of Acquired Account Payment Processing System (z) 505. Alternative environments are shown in FIGS. 7, 10 to 13. Although different references may be used to refer to the various system components, the components of FIG. 5 may relate to the components shown in FIGS. 7, 10 to 13. Different system configurations may also be used and the various system configurations shown in the Figures are illustrative examples.

In environment 500, an account holder (p) 508a uses a mobile device (q) 508b and its Cellular Telephony Carrier (r) 508 to verbally request offers from local merchants in the Account Holder (p) 508a's residential community. The merchants may be proximate to the current location of the mobile device, or along a common route taken by the mobile device (e.g. route between home and office), or within a general area of the account holders home or office, and so on.

Donation Audit Web Service 514, by use of information retrieved by access to one or more databases 578-596 (stored at e.g. data storage device 50), uses the verbally requested offers by: (i) converting them to text; (ii) retrieving the verbally requested offers using the textual conversion; (iii) synthesizing the retrieved verbally requested offers into spoken words contained in a digital file; and (iv) transmitting the digital file over one or more of Cellular Telephony Carrier (r) 508 for audible rending on Mobile Device (q) 508b for verbal selection from among the audibly rendered offers by Account Holder (p) 508a. The offers may be stored as part of merchant accounts 54, for example, or as separate accounts but linked to merchants via a merchant identifier, location identifier, and so on.

After Account Holder (p) 508a selects and confirms one or more such offers, such as described above with respect to Method 400 of FIG. 4, Account Holder (p) 508a navigates to the brick and mortar store of the selected merchant-offeror (Merchant (m) 510) in the residential community of Account Holder (p) 508a to conduct a financial transaction with the Merchant (m) 510. In some embodiments, a digital file containing the merchant address or directions may be transmitted to the mobile device for provision (verbally or otherwise) to account holder. The digital file may be used by a navigation system to direct the account holder to the merchant store, for example.

Figure 7:
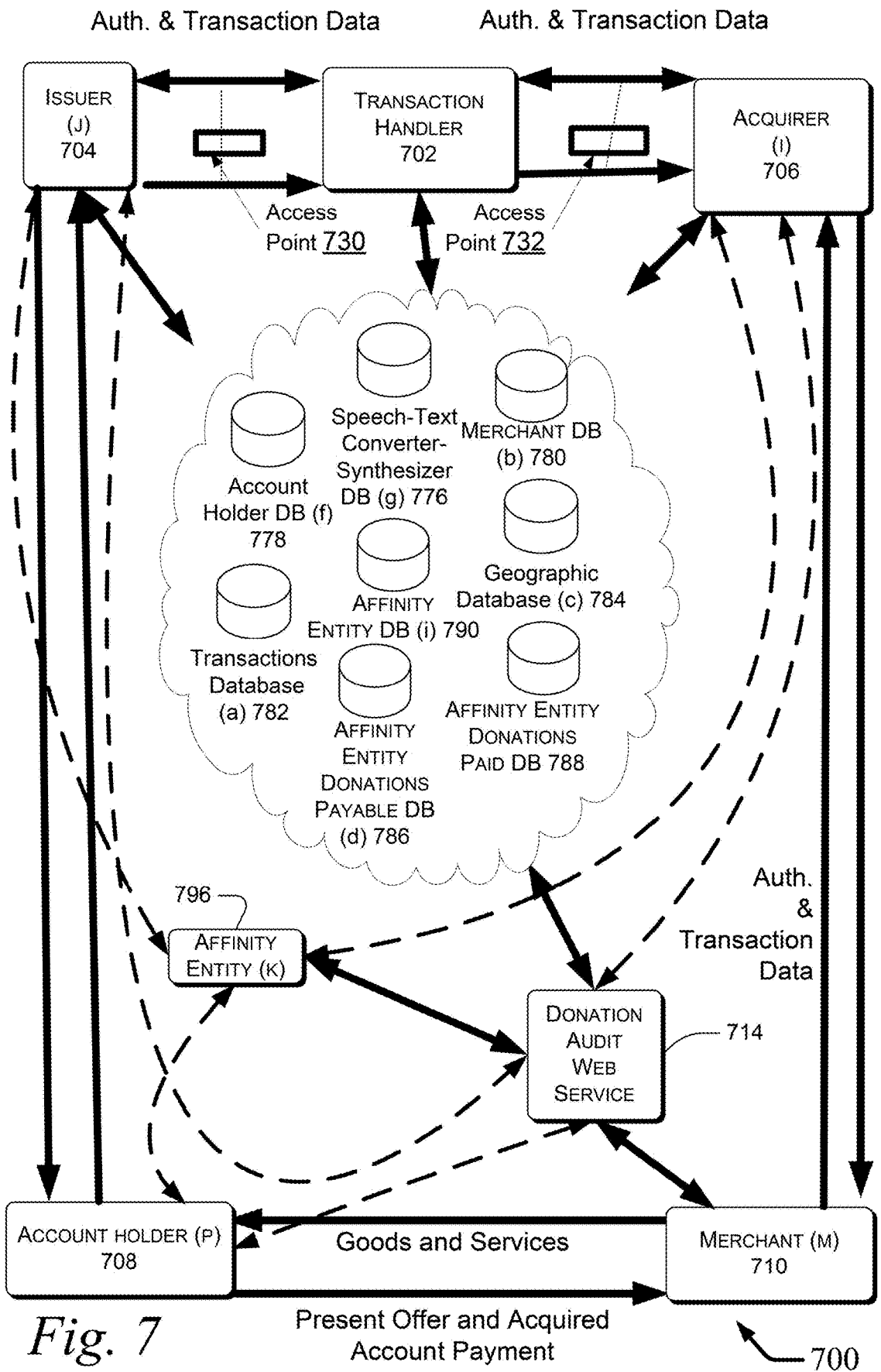
FIG. 7 illustrates an exemplary open loop payments processing system in which the processes of FIGS. 2, 4 and 6 can be performed, where the system processes transactions conducted by merchants with account holders, wherein, for each transaction, there is a provision of a service and/or good by the merchant to the account holder for the transaction which is conducted on an account issued to the account holder by an issuer, there is an authorizing and remunerating of an electronic payment by the account holder in conducting the transaction on the account with the merchant, and there are one or more charitable contributions by the merchant that are made to respective affinity entities incident to the transaction.

The transaction may be conducted on an account issued by an issuer of such accounts within Acquired Account Payment Processing System (z) 105, or other such as system as provided by the environment 700 illustrated in FIG. 7. Confirmation of the transaction may be received by Donation Audit Web Service 514 from Acquired Account Payment Processing System (z) 105. This confirmation obligates Merchant (m) 510 to make a donation to Affinity Entity (k) 596 according to the terms and conditions of the offer made by Merchant (m) 510 that was selected and confirmed by Account Holder (p) 508a. Stated otherwise, the Account Holder (p) 508a's financial transaction with the merchant (m) 510 may have been incentivized by the Merchant (m) 510's agreement to make a donation to an Affinity Entity (k) 596 in their shared local community as provided by the offer that had been previously specified by the Merchant (m) 510 to the Account Holder (p) 508a.

To conduct the transaction that triggers the donation by merchant (m) 510 to Affinity Entity (k) 596, as shown in FIG. 5, Account holder (p) 508 may present its issued account to a Merchant (m) 510 as tender for a financial transaction such as a purchase of goods and/or services. As part of the transaction, the Account Holder (p) 508a may offer a physical or virtue token bearing an identifier with which the Account Holder (p) 508 is associated. The token can be a credit, debit, pre-paid, or gift card. The token can also be a school or government identification card, social security number card, driver's license, credit card, debit card, prepaid card, cellular telephone number, etc. The token can be read by a reader operated by the Merchant (m) 510, which as a reader associated with a Point of Service terminal (POS). For example, the reader might read the identifier for the Account Holder (p) 508a from a magnetic strip on a plastic card, a computer chip or computer readable medium on a card, a rendering on a display screen of a cellular telephone or Personal Digital Assistant (PDA), a Near Field Communication (NFC) transmission for a card (e.g., a Visa Pay Wave® card) or from smart phone, etc.

Also shown in FIG. 5 are one or more affinity Entities (k) 596 and a Donation Audit Web Service 594 that may implement processes for the auditing of donations to the one or more Affinity Entities (k) 596 from various donors, for instance, the Merchant (m) 510 and the Account Holder (p). The Donation Audit Web Service 594 may have access to information resources within the following databases: one or more Speech-Text Converter-Synthesizer Database (g) 578, where '(g)' is an integer from 1 to 'G', that stores information for conversion of a digital file of captured speech into text and vice versa; one or more Account Holder Databases (f) 578, where '(f)' is an integer from 1 to 'F', that stores information about each Account Holder (p) 508, one or more Merchant Databases (b) 580, where '(b)' is an integer from 1 to 'B', that stores information about each Merchant (m) 510, one or more Transaction Databases 582, where '(a)' is an integer from 1 to 'A', that stores information about transactions between each Merchant (m) 510 and each Account holder (p) 508, and one or more Geographic Databases (c) 584, where '(c)' is an integer from 1 to 'C', that stores information about local communities with which the Account Holders 508 and the Merchants 510 and the Affinity Entities 596 can be associated through any of several different associations. By way of example, and not by way of limitation, construction of such associations (e.g., local communities) can include factors such as geographic, political, demographics, local transportation modes, navigational algorithms for geopolitical regions, cartographic data, planned communities, population density, cultural divides, racial population constituencies, census statistics, socio-economic factors, and combinations thereof.

Also seen in FIG. 5 are one or more Affinity Entity Databases 590, where '(i)' is an integer from 1 to 'I', to store information about each Affinity Entity (k) 596, one or more Affinity Entity Donations Payable Databases 586, where '(d)' is an integer from 1 to 'D', to store information about currency amounts of donations that are obligations that are to be paid by specific donors to each Affinity Entity (k) 596, and one or more Affinity Entity Donations Paid Databases 588, where '(e)' is an integer from 1 to 'E', to store information about currency amounts of donations that have been made by donors to each Affinity Entity (k) 596 from each Merchant (m) 510. Affinity Entity Databases may be stored at data storage device 50 or at affinity system 60 (FIGS. 10 to 13), for example.

Databases 578-596 (e.g. at data storage device 50) can be connected by one or more private or public networks, virtual private networks, the Internet, or by other means known to those skilled in the art. Moreover, not every entity seen in FIG. 5 at reference numerals 508, 510, and 594 must necessarily have real time, uninterrupted access to any or all of the Databases 578-590. Each such Databases 578-590 can assign, read, write, and query permissions as appropriate to the various entities. For example, a Merchant (m) 510 may have read-only access to the Transactions Database (a) 582.

Each of the one or more Transactions Databases (a) 582 can be used to store some or all of the transaction data originating at the Merchants (n) 510 for each transaction conducted between an Account holder (p) 508*a* and the Merchant (m) 510. The transaction data can include information associated with an identifier for the Account holder (p) 508*a* and the date and time of the transaction, among other more specific information including the amount of the transaction. The database can be searched using identifiers for the Account holder (p) 508*a* and the Merchant (m) 510, date and time (or within proximity thereof), or by any other field stored in the database.

Transactions Database (a) 582 can be designed to store information about each Merchant (m) 510, where the information can include a unique identification of each Merchant (m) 510, an identifier for each point of sale device in use by the Merchant (m) 510, and a physical geographic location of each store of the Merchant (m) 510. Also included in the Transactions Database (a) 582 is an identifier for Account holder (p) 508*a*, its Mobile Device (q) 508*b*, its Carrier (r) 508*c*, as well the name of an account holder who is registered to participate in a system in which donations can be made to each Affinity Entity (k) 596 as per rules stored in at least one of the Account Holder DB (f) 578 and Merchant DB (b) 580. This information may also be stored in various configurations, such as part of records 42, 54, 56, 58 at data storage device 50.

After registering to participate in the donation system, an Account holder (p) 508 initiates a qualifying purchase transaction with a Merchant (m) 510 by presenting a token bearing an identifier for the Account Holder (p) 508 to the Merchant (m) 510. The token can include both an identifier for an account issued to the Account Holder (p) 508*a*. The offer from the Merchant (m) 510 to the Account Holder (p) 508 can also be presented, where the offer has an expiration against which the time of the transaction can be compared to determine the validity of the offer. The token can be presented at the Point Of Service terminal (POS), such as POS 220 seen in FIG. 2, where the POS is capable of reading data on the token. Certain transaction information is transmitted from the POS in route to the Donation Audit Web Service 594. The transaction information can include a transaction time stamp, respective Merchant (m) 510, Account Holder (p) 508*a*, and offer identifiers, as well as indicia that payment for the transaction was made on an account issued to the Account Holder (p) 508*a*.

The Donation Audit Web Service 594 may use the respective merchant and account holder identifiers to access and retrieve respective merchant and account holder geographic locations from one or more of the Geographic Databases 584. For each transaction, determinations are made, using the respective merchant and account holder geographic locations, whether the Merchant (m) 510 and the Account Holder (p) 508 have a local community in common, and whether the transaction is being conducted within a predetermined time period using the time of the transaction time stamp and the offer identifier. Note that the expiry of the offer may be retrieved from one or more of the Merchant DBs 580 assessable to the Donation Audit Web Service 594, which contains offers, their terms, and their corresponding offer identifiers.

For each transaction that is conducted within the predetermined time period after which the offer will expire and where the Merchant (m) 510 and the Account Holder (p) 508 have a local community in common, the Donation Audit Web Service 594 retrieves a merchant donation business rule for the Merchant (m) 510. Note that the merchant donation business rule can be retrieved from one or more of the Merchant DBs 580 (at data storage device 50, or merchant system 30) assessable to the Donation Audit Web Service 514, which contains merchant business rules and their corresponding merchant identifiers.

From the foregoing, a determination is made by the Donation Audit Web Service 514 that the Merchant (m) 510 is to make a donation to Affinity Entity (k) 596 which has been determined to have the same local community as that of the Account Holder (p) 508*a* and Merchant (m) 510. Note that the Affinity Entity (k) 596 can be retrieved from one or more of the Affinity Entity DBs 590 assessable to the Donation Audit Web Service 594 which contains information about Affinity Entity (k) 596 indexed by its corresponding affinity entity identifier.

The donation to be made by the Merchant (m) to the Affinity Entity (k) 596 may be derived using the merchant's donation business rule retrieved from one or more of Merchant DBs 580. Donation Audit Web Service 514 transmits a message containing the donation to be made by the Merchant (m) to the Affinity Entity (k) 596 for the predetermined time period to one or more logical addresses, including a logical address of the Merchant (m) 510, a logical address of the Account Holder (p) 508*a*, and a logical address of the Affinity Entity (k) 596. It is advantageous to send the donation to the logical address of the Account Holder (p) 508*a* to confirm the obligation of the Merchant (m) 510's commitment to donate. It is advantageous to send the donation to the logical address of the Affinity Entity (k) 596 to inform the same of the Merchant (m) 510's commitment to donate so that planning for responsible use of the donation can be made. Alternatively, for reasons stated herein, while it is advantageous to send the amount of the donation to the logical address of the Merchant (m) 510 to inform the same of its commitment to donate, it might not be advantageous to send the identity of the donee to the donor who may object to the donation on the basis of the donee's identity, purpose and/or goals. Accordingly, a message sent to the logical address of the Merchant (m) 510 need not identify the Affinity Entity (k) 596, and can instead simply send the amount of the donation to the logical address of the Merchant (m) 510.

After a predetermined audit time period for each offer's validity, for each of the merchant identifiers to which transactions pertain as described above, for each Affinity Entity (k) 596 to whom a donation was to be made by the Merchant (m) 510 for the predetermined time period—either directly or through a blind donation distribution service as discussed elsewhere herein, the Donation Audit Web Service 514 determines a difference between the sum of the currency amounts of the donation receipts that were transmitted to the logical address of the Merchant (m) 510 for the Affinity Entity (K) 596, and the sum of the currency amounts of the donation receipts that were received for the Affinity Entity (K) 596 for the Merchant (m) 510 for the predetermined time period. Any such difference can then be transmitted to a logical address that is one or more of the logical address of the merchant, the logical address of the account holder, and the logical address of the affinity entity. It is advantageous to send confirmation of the sum of its donations to the logical address of the Merchant (m) 510 to confirm compliance with its prior commitments to donate. It may be advantageous to send a summary of donations made by merchants with whom the Account Holder (p) 508*a* has transacted in order to confirm to the Account Holder (p) 508 the community advantages of doing business with community merchants, where such a summary of merchant donations can be sent to the logical address of the Account Holder (p) 508, thereby informing the same of the integrity of the community merchant's commitment to donate to the community. It may be advantageous to send the summary of donations to the logical address of the Affinity Entity (k) 596 to inform the same as to the completion, or absence of completion, as to obligations made by community merchants regarding their respective commitments to donate to the local community of the Merchant (m) 510 and Account Holder (p) 508*a*.

A computed and unacceptably high difference that is sent to the logical address of the Merchant (m) 510 can be used the Merchant (m) 510 to make up the difference by a payment made by the Merchant (m) 510 directly to the Affinity Entity (k) 596 owed. Alternatively, the difference payment may be made indirectly to a blind donations disbursement agency for subsequent payment of the difference to the Affinity Entity (k) 596 to whom the Merchant (m) 510 made a commitment, albeit a blind commitment, to contribute.

Figure 6:
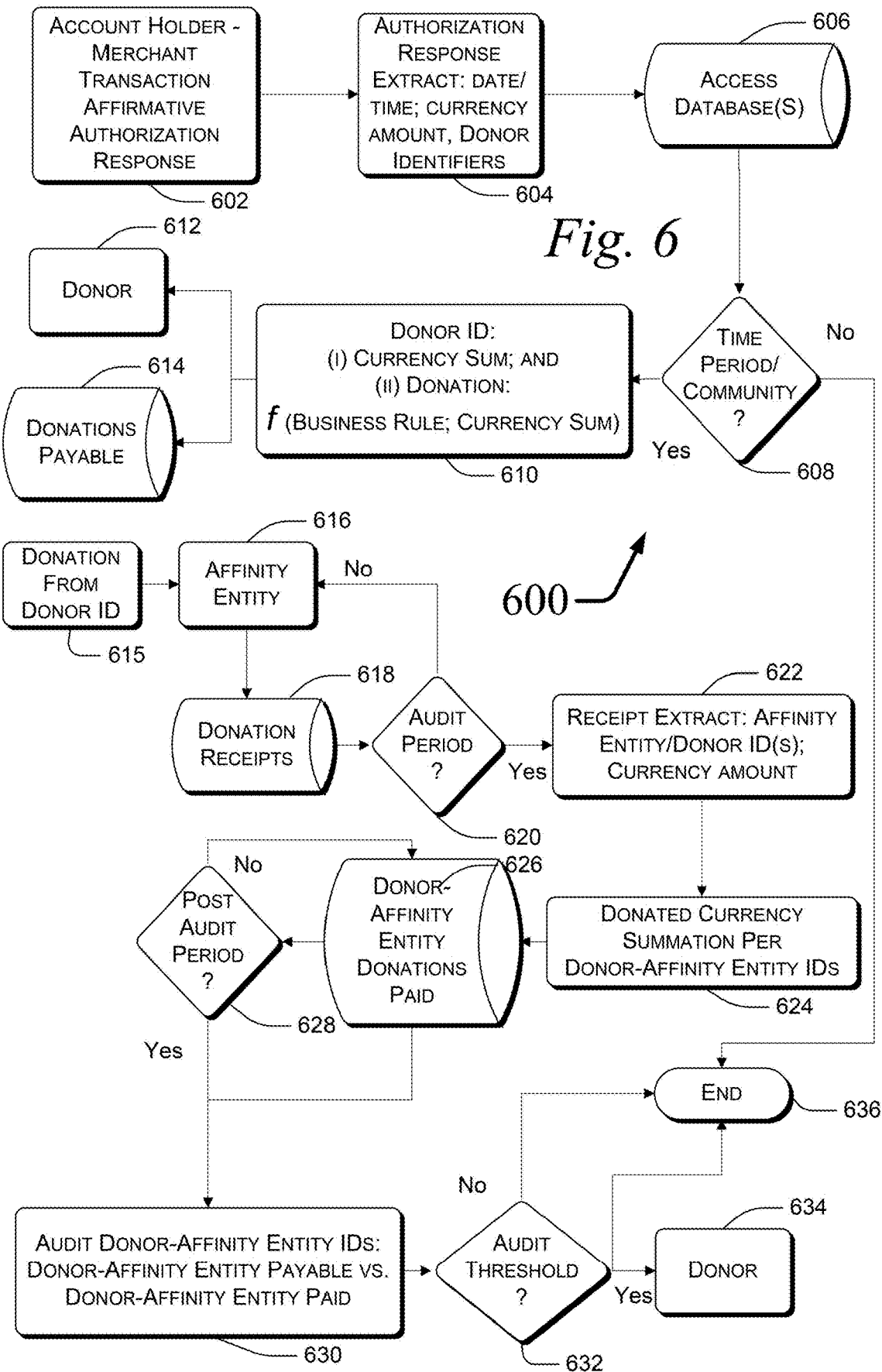
FIG. 6 is a flowchart illustrating an exemplary process by which a transaction conducted with a merchant by a web enabled mobile computing device user obligates the merchant to make an audited donation to an affinity entity that providing goods and/or services to a community in common to both the user and the selected merchant.

Referring to FIG. 6, a flowchart illustrates a Process 600 that can be performed by a system (e.g. FIGS. 5, 7, 10-13), such as Donation Audit Web Service 214/514/714, for using local merchants' commitments to make charitable contributions to local charities as incentives to local residents to conduct transactions with the local merchants. Prior to step 602 of Process 600, as discussed above with respect to FIGS. 1-5, a registered local community resident conducts a transaction on an account issued to the resident at a brick and mortar store of a local community merchant. Prior to this transaction, as discussed above with respect to FIGS. 1-5, the registered local community resident uses a mobile device (or other computing device, such as navigation system, tablet, and so on) to verbally request offers from community merchants, and then verbally select and confirm one or more such offers.

At step 602, information is received as derived from a positive authorization response originating from an issuer of an account upon which the transaction was conduct by mobile device user with the merchant who made an offer that was verbally accepted by the mobile user as describe above with respect to FIGS. 1-5. Data from this information can be extracted at step 604 by a POS, including, by way of example and not by way of limitation, the current date and time, a total currency amount paid on the customer's account to the merchant, respective identifiers for the customer, the local affinity entity to whom the local merchant if to make the obligatory donation, etc.

Identifiers retrieved at steps 602-604 can be used to access one or more databases (at data storage device 50) at step 606. The current date and time for the offer verbally selected and confirmed by the customer may have been received by the local merchant in a transmission such as has been described with respect to step 418 of Method 400. As such, the non-expiration of the offer verbally selected and confirmed by the customer is assessed in a query at step 608. While an invalid offer determination ends Process 600 at step 636, Process 600 proceeds to step 610 when the offer is valid as determined at query 608.

At step 610, rules for calculating a donation to be made by the merchant to the local affinity entity may be retrieved using data acquired in steps 602-604. This calculation can include steps to access one or more databases as shown at reference numerals 612-614, including transmitting to and/ or storing the calculated donation to merchant donor 612 and/or one or more merchant donations payable databases 614.

Subsequent to the acquired transaction on the resident's account as processed in steps 602-614 of Process 600, the local merchant makes the calculated donation to the local affinity entity as shown at step 615. The local affinity entity, as shown at step 616, sends notice of the donation's receipt for storage in one or more databases (e.g. at data storage device 50) as shown at step 618.

After a predetermined audit time period as passed as determined by a query at step 620, an audit is conducted to insure compliance by each community merchant in its donation commitments to each of the one or more affinity entities or charities for each community that the merchant and/or its customers is a member. This audit can include adding up all required donations for each local merchant to each local affinity entity or charity as shown at step 622. The donation summation for each local merchant to each local charity derived at step 624 is compared to information in one or more databases 626 to ascertain compliance of each merchant with its donation obligations. Stated otherwise, the local merchant has a certain amount of time after a predetermined audit period, as determined at step 628, by which to make all of the merchant's donation obligations to local affinity entities.

Differences between donations paid and donations still payable by each local merchant are calculated at step 630, which differences are subjected to an audit threshold query at step 632. If a local merchant's donations paid is non-compliant with donations still payable, as may be determined by the audit threshold query at step 632, then Process 600 moves to step 634 to notify the local merchant accordingly of its deficiency. Otherwise, affirmative results at query 632 causes Process 600 to terminate at step 636 which may also include notice of compliance being transmitted to each such complaint local merchant, its customers, and/or each of the local affinity entities, either by way of summary report, donations to respective affinity entities by the merchant, and variations thereof.

To summarize Process 600 in various implementations thereof, data is extracted from information derived incident to a positive authorization response for an acquired transaction conducted on a local resident's account, such as chronological information pertaining to the transaction including date and time, a currency amount of the transaction, and any other data desired to assist in a proper calculation of the merchant's obligatory donation to a local Affinity Entity. By way of example, an identifier for the merchant can be extracted, as well as an identifier for the local community resident as offered to the merchant by the same. The account number, by way of non-limiting example, can be a Primary Account Number (PAN) including a Bank Identifier Number or BIN code for a credit or debit card that is kept by the merchant in a 'card-on-file' database Note the business rules can be set and used such that obligatory donations to local Affinity Entities can be made by one or more of the following participants in a payment processing system: the account holder, the account holder's issuer, the merchant, the merchant's acquirer, and the transaction handler. Via access to one or more databases at step 606, and by using the merchant and/or account holder identifiers extracted from the information derived from the positive authorization response, more information can be retrieved. Thereafter, database access can retrieve business rules used to calculate one or more donations that are to be made to the charity or affinity entities by one or more donors respectively corresponding to the account holder, the account holder's issuer, the merchant, the merchant's acquirer, and the transaction handler. Stated otherwise, the donation can be a function of the amount of the transaction and the retrieved business rule(s).

Donations, per extracted donor IDentifier (ID), may be made for those transactions that occur during a predetermined time period and within a predefined geographic location as determined by a query (not shown). If the result of geographic query is affirmative, process 600 moves to step 610 where the donations that are to be made by the donors are calculated as a function of the respective business rules. Otherwise, no donation is made and process 600 terminates at step 636. Stated otherwise, Process 600 is intended to obligate a local merchant to make a donation to a local affinity entity (e.g., a local charity) when a local resident conducts a transaction at the local merchant's brick and mortar store in the same community where the local resident resides. Note that the terms 'local', 'resident', 'residential', and 'community' can be alternatively defined as described elsewhere herein.

Donations calculated at step 610 may be communicated to the local merchant donor at step 612 and stored in a donations payable database 614. Thereafter, donations 615 may be received at affinity entities at step 615 from donors identified by either respective donor IDs, which can be the identifier for the merchant. Donations received are stored in donation receipts database 618. Data from donations that are made by donors via communication to affinity entities during an audit period, as determined at query 620, is extracted at step 622. The donation related data that is extracted at step 622 can include the donor ID, and the currency amount of the donation. During the audit period, a sum of donations to each affinity entity made by each local merchant donor for the audit period is calculated and stored in a donor-Affinity Entity donation paid database 626 (e.g. at data storage device 50). After a predetermined time period, an audit period begins, as determined by query 628. During the audit time period, differences in donations paid are compared to donations payable for each donor at step 630. Differences exceeding a predetermined audit threshold, as determined by query 632, are communicated to the respective local merchant donors at step 634. Of course, the charitable audit functions, such as have been described above, can be performed by an agent of any donor and/or of a loyalty system organization charged with implementing all or portions of process 600. Such an auditing agent can be, by way of non-limiting example, a certified public accountancy agency, a non-government regulatory agency, a governmental agency, and the like.

As further discussed above with respect to various implementations, a donation mechanism can be set up such that the Merchant-Donor 634 makes blind donations, either directly or indirectly, to a single donation disbursement entity who in turn disburses the donations to those affinity entities selected by the customers of the Merchant-Donor 634. This donation mechanism provides neither knowledge nor notice to Merchant-Donor 634 as to the identities of its donation recipients, thereby avoiding circumstances that force a merchant, by virtue of its prior commitment, to make a donation to a local community affinity entity whose role, or purpose is inimical or otherwise repugnant to the Merchant-Donor 634. As such, the donation mechanism leaves the direction of the donations fully within the discretion of the customers, limited only by the restriction that the customer can only select from among those affinity entities that serve the local community that is in common to both the customer and the Merchant-Donor 634, while leaving the actual amount of the donation fully within the discretion of the Merchant-Donor 634.

The diagram of FIG. 7 depicts an exemplary process 700 of a particular financial transaction system, such as may be described as an open loop system, in which an account holder (p) 708 conducts a financial transaction with a Merchant (m) 710. By way of example, the Account Holder (p) 708's financial transaction with the Merchant (m) 710 may have been incentivized by the Merchant (m) 710's agreement to make a donation to an Affinity Entity (k) 795 in the local community as defined by the Merchant (m) 710 through an ad incentive which is communicated in an audible rendering to Account Holder (p) 708 instigated by a verbal request for the same, preferably by use of a web enabled mobile computing device as described above with respect to illustrations in FIGS. 1-6, and as referred to in FIGS. 10 to 13 as customer device 48.

In FIG. 7, by way of explanation for the nomenclature of reference numerals used and described in the specification, a lower case letter in parenthesis is intended to mean an integer variable having a value from 1 to the capital case of the lower case letter, which value can be large (i.e., approaching infinity). Thus '(b)' is intended to mean that the integer 'b' can have a value from 1 to B, and '(c)' is intended to mean that the integer 'c' can have a value from 1 to C, etc. As such, drawing elements 704-710 and 776-790, and 796 in FIG. 7 are illustrated with a block, but indicate one or more elements can be present. For example, Issuer (j) 704 is one of a possible plurality of issuers, where j may range from 1 to a large integer 'J'.

Account Holder (p) 708 presents an electronic payment device (i.e.; a credit card) to a Merchant (m) 710 as tender for a financial transaction such as a purchase of goods and services. Other financial transactions and instruments other than credit cards may also be used, including, but not limited to, a prepaid card, a gift card, a debit card, a token equivalent of an account as communicated via cellular telephony, near field communications, and the like. For purposes of illustration and explanation, however, reference will be made to a credit card.

As part of the transaction, the Account Holder (p)'s 708 payment device can be a credit card, debit card, prepaid card, cellular telephone, Personal Digital Assistant (PDA), etc. The payment device is read by a reader operated by the Merchant (m) 710, whereupon account information is read from the payment device and a request for authorization is transmitted to the Merchant (m) 710's Acquirer (i) 706. Each Acquirer (i) 706 is a financial organization that processes credit card transactions for businesses, for example merchants, and is licensed as a member of a Transaction Handler 702 such as a credit card association (i.e., Visa Inc., MasterCard, etc.) As such, each Acquirer (i) 706 establishes a financial relationship with one or more Merchants (n) 710.

The Acquirer (i) 706 transmits the account information to the Transaction Handler 702, who in turn routes the authorization request to the account holder's issuing bank, or Issuer (j) 704. The Issuer (j) 704 returns information via an authorization response to the Transaction Handler 702 who returns the information to the Merchant (m) 710 through the Acquirer (i) 706. The Merchant (m) 710, now knowing whether the Account Holder (p) 708's credit card account is valid and supports a sufficient credit balance, may complete the transaction and the Account holder (p) 708 in turn receives goods and/or services in exchange. Most credit card associations instruct merchants that, after receiving an affirmative authorization response, the detailed credit card account information obtained by a point of service terminal (e.g., such as via a magnetic stripe scanner) must be deleted.

To reconcile the financial transactions and provide for remuneration, information about the transaction is provided by the Merchant (m) 710 to Acquirer (i) 706, who in turn routes the transaction data to the Transaction Handler 702 who then provides the transaction data to the appropriate Issuer (j) 704. The Issuer (j) 704 then provides funding for the transaction to the Transaction Handler 702 through a settlement bank. The funds are then forwarded to the Merchant's (n) 710 Acquirer (i) 706 who in turn pays the Merchant (m) 710 for the transaction conducted at step 762 less a merchant discount, if applicable. The Issuer (j) 704 then bills the Account holder (p) 708, and the Account holder (p) 708 pays the Issuer 704 with possible interest or fees.

Also shown in FIG. 7 are one or more Affinity Entities (k) 796 and a Donation Audit Web Service 714 that implements processes by which donations to the one or more Affinity Entities (k) 796 from various donors, for instance, any Issuer (j) 704, an Merchant (m) 710, any Acquirer (i) 706, and the Transaction Handler 702. Other system configurations may be used, such as the illustrative examples shown in FIGS. 10 to 13. Donation Audit Web Service 714 implementations processes for the auditing of donations to the one or more Affinity Entities (k) 796. The Donation Audit Web Service 714 has access to information resources within the following databases: Speech-Text Converter-Synthesizer Databases 776; Account Holder DBs 778; Merchant DBs 780; Transaction Databases 782; and Geographic Databases 784. These databases may be persistently stored at data storage device 50.

By way of example, and not by way of limitation, construction of local, geographic, residential or community associations between merchants and their customers can include factors such as geographic, political, demographics, local transportation modes, navigational algorithms for geopolitical regions, cartographic data, planned communities, population density, cultural divides, racial population constituencies, census statistics, socio-economic factors, and combinations thereof.

Also seen in FIG. 7 are Affinity Entity DBs 790; Affinity Entity Donations Payable DBs 786; and Affinity Entity Donations Paid DBs 788. Databases 778-790 can be connected by one or more private or public networks, virtual private networks, the Internet, or by other means. These databases may be persistently stored at data storage device 50. Moreover, not every entity seen in FIG. 7 at reference numerals 708, 710, 796 and 794 must necessarily have real time, uninterrupted access to any or all of the Databases 778-790 at data storage device 50. Each such Databases 778-790 can assign, read, write, and query permissions as appropriate to the various entities. For example, a Merchant (m) 710 may have read access to the Transactions Database (a) 782.

The Transactions Database (a) 782 can be designed to store some or all of the transaction data (e.g. transaction data 58 at data storage device 50) originating at the Merchants (n) 710 that use a payment device for each transaction conducted between an Account holder (p) 708 and the Merchant (m) 710. The transaction data can include information associated with the account of an Account holder (p) 708, date, time, and an identifier sufficient to determine a physical geographic location where the transaction took place, among other more specific information including the amount of the transaction. The database can be searched using account information, date and time (or within proximity thereof), or by any other field stored in the database.

The Transactions Database (a) 782 is also designed to store information about each Merchant (m) 710, where the information can include a unique identification of each Merchant (m) 710, an identifier for each point of sale device in use by the Merchant (m) 710, and a physical geographic location of each store of the Merchant (m) 710.

Also included in the Transactions Database (a) 782 is account information for payment devices associated with Account holder (p) 708, such as part or all of an account number, unique encryption key, account information, and account name of an account holder who is registered to participate in a system in which donations can be made to each Affinity Entity (k) 790 as per rules stored in Donations Biz Rule Database (b) 780. After registering to participate in the donation system, an Account holder (p) 708 initiates a qualifying purchase transaction with a Merchant (m) 710 by presenting a payment device at step 758 to the Merchant (m) 710. The payment device is typically presented at the Point Of Service terminal (POS) at which data thereon is read. Certain transaction information is transmitted from the POS in route to the Merchant's (n) 710 Acquirer (i) 706. The transaction information can include account information, account name, transaction balance, transaction time, transaction date, and transaction location. Sensitive information includes information such account number and account holder name that identify and associate a particular account with a particular account holder. This transaction information may be transmitted via a less secure communication medium. In addition, a transmission of transaction data may occur with weak or no encryption between two or more points from the point of origin, such as the point of sale device at the Merchant (m) 710, and the ultimate destination, such as the Acquirer (i) 706. These points can include, without limitation, from the reader at the POS, the POS at the Merchant (m) 710 and a network router or computer that is connected to a network but is housed and maintained by the Merchant (m) 710 and between the Merchant (m) 710 and the Acquirer (i) 706. The communication channel could be Ethernet, wireless internet, satellite, infrared transmission, or other known communication protocols. Some or all of the transmission may also be stored for record keeping, archival or data mining purposes with little or no encryption. For example, the Merchant (m) 710 may store transaction data, including certain account information in the Merchant's (n) 710 accounts on file database for reuse later.

During a transaction conducted by Merchant (m) 706 on an account issued by Issuer (j) 704 to Account Holder (p) 708, information relating to the qualifying purchase may be retrieved from the POS at Merchant (m) 706. The transaction information is comprised of account information together with other information about the transaction itself: time, date, location, value, etc. Certain of the transaction information are considered sensitive information including, without limitation, account number, credit card verification number, and account name.

To pay the donation to each Affinity Entity (k) 796 so specified in screen shot 304, the Account Holder (p) 708's Issuer (j) 704 can pay the Affinity Entity (k) 786 and place a debit in that currency amount on the Account Holder (p) 708's periodic revolving credit statement. The Account Holder (p) 708, upon receipt of the statement, can thereafter make a total payment to the Issuer (j) 704 of the currency amount of the donation that appears as a debit on the statement along with the other credit charges that also appear on the Account Holder (p) 708's statement.

Both the Account Holder (p) 708 and the Merchant (m) 710 can change or disable a donation commitment at any time by accessing a server that serves web pages rendering screen shots 302, 304, respectively. Thus, charitable donation commitments can be easily and instantly enabled or disabled using the real time user interface. By way of example, and not by way of limitation, such servers can be hosted by the Donation Audit Web Service 214, 514, and 714 seen in FIGS. 2, 5 and 7, respectively.

Referring again now to FIG. 7, further illustrations are seen of a telecommunications network that may make use of any suitable telecommunications network and may involve different hardware, different software and/or different protocols then those discussed below. FIG. 7 is a global telecommunications network that supports purchase and cash transactions using any bankcard, travel and entertainment cards, and other private label and proprietary cards. The network also supports ATM transactions for other networks, transactions using paper checks, transactions using smart cards and transactions using other financial instruments. These transactions are processed through the network's authorization, clearing and settlement services. Authorization occurs when an issuer approves or declines a sales transaction before a purchase is finalized or cash is dispersed. Clearing occurs when a transaction is delivered from an acquirer to an issuer for posting to the customer's account. Settlement is the process of calculating and determining the net financial position of each member for all transactions that are cleared. The actual exchange of funds is a separate process.

Transactions can be authorized, cleared and settled as either a dual message or a single message transaction. A dual message transaction is sent twice—the first time with only information needed for an authorization decision, an again later with additional information for clearing and settlement. A single message transaction is sent once for authorization and contains clearing and settlement information as well. Typically, authorization, clearing and settlement all occur on-line.

Figure 9:
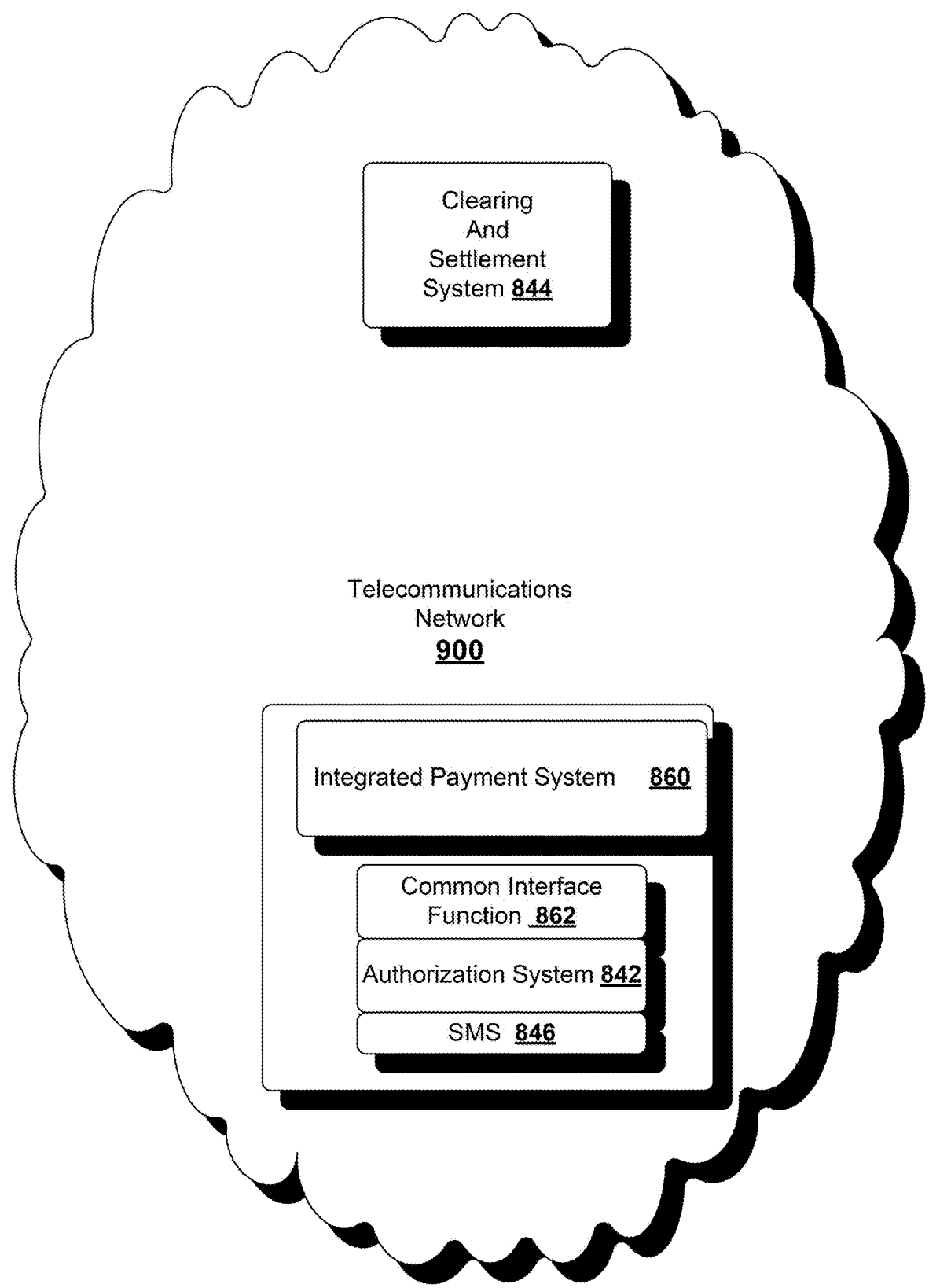
FIG. 9 illustrates further exemplary details of the systems illustrated in FIG. 8.

Referring now to FIGS. 7-9, FIG. 7 includes access points 730, 732 between Transaction Handler 702 and each Acquirer (i) 706 and Issuer (j) 704. Other entities such as drawee banks and third party authorizing agents may also connect to the financial; network through an access point (not shown). An interchange center has systems, such as those seen at reference numeral 840 see in FIG. 8, so as to be a data processing center that may be located anywhere in the world. Each interchange center houses the computer system that performs the network transaction processing. The interchange center serves as the control point for the telecommunication facilities of the network, which comprises high-speed leased lines or satellite connections, for instance as may be based on IBM SNA protocol. Preferably, the communication lines that connect an interchange center (Transaction Handler 702) to remote entities use dedicated high-bandwidth telephone circuits or satellite connections, for instance as may be based on the IBM SNA-LUO communication protocol. Messages are sent over these lines using any suitable implementation of the ISO 8583 standard.

Access points 730, 732 may be made up of small computer systems located at a processing center that interfaces between the center's host computer and the interchange center system 840. The access point facilitates the transmission of messages and files between the host and the interchange center supporting the authorization, clearing and settlement of transaction. Telecommunication links between the Acquirer (i) 796 and its access point 732, and between the access point 730 and Issuer (j) 704 are typically local links within a center and use a proprietary message format as preferred by the center.

A data processing center (such as is located within an acquirer, issuer, or other entity) houses processing systems that may support merchant and business locations and maintain customer data and billing systems. Preferably, each processing center may be linked to one or two interchange centers. Processors may be connected to the closest interchange, and if the network experiences interruptions, the network may automatically route transactions to a secondary interchange center. Each interchange center is also linked to all of the other interchange centers. This linking enables processing centers to communicate with each other through one or more interchange centers. In addition, processing centers can access the networks of other programs through the interchange center. Further, the network ensures that all links have multiple backups. The connection from one point of the network to another is not usually a fixed link; instead, the interchange center chooses the best possible path at the time of any given transmission. Rerouting around any faulty link occurs automatically.

FIG. 8 illustrates systems 840 housed within an interchange center to provide on-line and off-line transaction processing. For dual message transaction, authorization system 842 provides authorization. Authorization system 842 supports on-line and off-line functions, and its file includes internal systems tables, a customer database and a merchant central file. The on-line functions of system 842 support dual message authorization processing. This processing involves routing, account holder and card verification and stand-in processing, and other functions such as file maintenance. Reporting includes authorization reports, exception file and advice file reports, POS reports and billing reports. A bridge from system 842 to a Single Message System (SMS) 846 makes it possible for issuers and acquirers to use system 842 to communicate with other issuers and acquirers using system 546 and access the SMS gateways to outside networks.

Clearing and settlement system 844 clears and settles previously authorized dual message transactions. System 844 collects financial and non-financial information and distributes reports between members. It also calculates fees, charges and settlement totals and produces reports to help with reconciliation. A bridge forms an interchange between system 844 processing centers and system 848 processing centers. Data from system 800 may be stored as part of transaction data 58 (at data storage device 50 of FIG. 10)

Single message system 846 processes full financial transactions and can also process dual message authorization and clearing transactions, as well as communicate with system 842 using a bridge and accesses outside networks as required. System 846 processes cashless issued account-based acquired transactions, for instance Visa, Plus, Interlink. Maestro, Cirrus, and others. By way of example, SMS files comprise internal system tables that control system access and processing, and an account holder database, which contains files of account holder data used for Personal IDentifier (PIN) verification and stand-in processing authorization. System 846 has on-line functions that perform real-time account holder transaction processing and exception processing for authorization as well as full financial transactions. System 846 also accumulates reconciliation and settlement totals. System 846 also has off-line functions that process settlement and funds transfer requests and provide settlement and activities reporting. Settlement service 848 consolidates the settlement functions of system 844 and 846 for cashless issued account-based acquired transactions into a single service for all products and services. Clearing continues to be performed separately by system 844 and system 846.

FIG. 9 illustrates another view of components of FIG. 8 in a telecommunications network 900. Integrated payment system 960 is the primary system for processing all on-line authorization and financial request transactions. System 960 reports both dual message and single message processing. In both cases, settlement occurs separately. The three main software components are the common interface function 962, authorization system 942 and single message system 946.

Common interface function 962 determines the processing required for each message received at an interchange center. It may choose the appropriate routing, based on the source of the message (system 942, 944 or 946), the type of processing request and the processing network. This component may perform initial message editing, and, when necessary, parses the message and ensures that the content complies with basic message construction rules. Common interface function 962 routes messages to their system 942 or system 946 destinations.

Referring again now to FIGS. 2, 5, and 7-9, further illustrations are seen of a telecommunications network that may make use of any suitable telecommunications network and may involve different hardware, different software and/or different protocols then those discussed below. FIGS. 2, 5, and 7-9 include a global telecommunications network that supports purchase and cash transactions using any bankcard, travel and entertainment cards, and other private label and proprietary cards. The network also supports ATM transactions for other networks, transactions using paper checks, transactions using smart cards and transactions using other financial instruments. These transactions are processed through the networks authorization, clearing and settlement services. Authorization occurs when an issuer approves or declines a sales transaction before a purchase is finalized or cash is dispersed. Clearing occurs when a transaction is delivered from an acquirer to an issuer for posting to the customer's account. Settlement is the process of calculating and determining the net financial position of each member for all transactions that are cleared. The actual exchange of funds is a separate process. The telecommunications network may also connect the components shown in FIGS. 10 to 13.

In at least some implementations, the system may include one or more processors (e.g., digital signal processors, microprocessors, etc.), each being adapted to execute instructions to perform at least some of the methods, operations, and processes described herein with respect to the figures. Such instructions may be stored or held in storage media as instructions.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

By way of example, the web enabled mobile device 102 seen in FIG. 1 communicates with a server, for example, Donation Audit Web Service 214 seen in FIG. 2. This may also extend to customer device 48 which may communicate with Donation Audit Web Service 214/514/714 seen in FIGS. 5, 7, 10 to 13. While the latter may be programmed using server-client coding methodologies, an application executing on the former can be a thin client mobile web browser or an application specific to perform implementations described herein. Such a specific application can be coded to execute on a mobile device running an open source operating system. For example, the Tizen operating system can be used as the operating system for the mobile device 102 seen in FIG. 1, which can be a smartphone, a tablet, an in-vehicle infotainment (IVI) device controller or "head-unit", or other web enabled mobile computing device.

Referring now to FIGS. 10 to 13, there is shown various system configurations in accordance with embodiments described herein. The components of systems shown in FIGS. 10 to 13 may correspond to one or more components shown in FIGS. 2, 5, 7.

Loyalty system 20 interacts with merchant system 40, data storage devices 50, an affinity system 60, and a card issuer system 80 to process verbal commands relating to offers, process transaction, collect data regarding offers, transactions, merchants, customers, affinity entities, process donations, transfer funds, and so on.

Loyalty system 20 may be implemented using a server and data storage devices 50 configured with database(s) or file system(s), or using multiple servers or groups of servers distributed over a wide geographic area and connected via a network. Loyalty system 20 may be connected to a data storage device 50 directly or via to a cloud based data storage device interface via network. Loyalty system 20 may reside on any networked computing device including a processor and memory, such as a personal computer, workstation, server, portable computer, mobile device, personal digital assistant, laptop, tablet, smart phone, WAP phone, an interactive television, video display terminals, gaming consoles, electronic reading device, and portable electronic devices or a combination of these. Loyalty system 20 may include one or more microprocessors that may be any type of processor, such as, for example, any type of general-purpose microprocessor or microcontroller, a digital signal processing (DSP) processor, an integrated circuit, a programmable read-only memory (PROM), or any combination thereof. Loyalty system 20 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like. Loyalty system 20 may include one or more input devices, such as a keyboard, mouse, camera, touch screen and a microphone, and may also include one or more output devices such as a display screen and a speaker. Loyalty system 20 has a network interface in order to communicate with other components, to serve an application and other applications, and perform other computing applications by connecting to network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Although only one loyalty system 20 is shown for clarity, there may be multiple loyalty systems 26 or groups of loyalty systems 26 distributed over a wide geographic area and connected via e.g. network. Loyalty system 20 may be connected to the Internet or other network in order to interact and connect with merchant system 40, customer device 48 and affinity system 60.

Loyalty system 20 includes a cardholder benefits (e.g. incentives) processing utility 32. A cardholder may be a customer of merchant and a member of the loyalty program to receive incentives to for cash payments at a brick and mortar store. The loyalty program may be associated with a card issuer system 80. In one example of an implementation, the cardholder benefits processing utility 32 may be a software component of a web utility that provides a loyalty engine. Accordingly, cardholder benefits processing utility 32 may be referred to as a loyalty engine. The cardholder benefits processing utility 32 may be programmed to configure the data storage device database 32 with benefits accounts 52 of the various cardholders who are members of the loyalty program. The benefits accounts may comprise a record of incentives for the member, along with details of transactions associated with incentives and customer attributes and preferences (such as e.g. location data, preferred affinity entity data).

The loyalty system 20 may be programmed to configure the data storage device 50 with merchant accounts 54 of the various merchants who are registered with loyalty system 20 to provide loyalty programs and offer incentives or benefits to encourage cash payments and in-store transactions through donations to affinity entities. As described herein, the merchant accounts 54 may include a variety of information and attributes regarding different merchants, including locations, goods and services, offers, transactions, donations, and so on.

The loyalty system 20 may be programmed to configure the data storage device 50 with card or member accounts 56 who are registered with loyalty system 20 or with card issuer system 80 to provide loyalty cards to cardholders for loyalty programs. The loyalty cards may be physical cards with computer readable indicia to identify the cardholder, and may also be an electronic card for storage on storage device of mobile device or smart phone of cardholder. The loyalty card may be associated with a value account for the merchant for payment of transactions with merchant. The card issuer system 80 may operate a loyalty program (via points and reward program utility 82) in conjunction with a loyalty program offered by loyalty system 20. Loyalty system 20 may provide a bridge between points and reward program utility 82 and merchant systems 40 and affinity systems 60. Cardholder registration utility 84 may enable a cardholder to register with card issuer system 80, where data regarding the cardholder may be stored as member accounts 56 at data storage device 50.

Access to different aspects and account records of the data storage device 50 may be provided by an administration utility (not shown) that enables hierarchical access to the data storage device 50, depending on permissions assigned by the operator of the loyalty system, to each of members, and merchants. The purpose of providing this access is to provide transparency to the benefits being provided to members who are cardholders by operation of the loyalty system 20.

Loyalty system 20 further includes a reporting utility or transaction data reporting tool 38, which may be further linked to the cardholder benefits processing utility 32 and data storage device 50 to provide various reports of interest to merchants and cardholders. For example, transaction data reporting 36 may permit merchants to generate reports on measured performance of benefits or incentives provided to them by the loyalty system 20 in their sphere of interest. Merchant system 40 may receive the report via merchant interface 28 and merchant reporting tool 46. One of the purposes of the reporting utility 36 is to enable the organizations linked to the loyalty system 20 to calibrate their involvement (e.g. by merchants calibrating the benefits that they provide) targeted to cardholders, and to review the results of their loyalty programs management by loyalty system 20. Card issuer system 80 may similarly use a card issuer reporting tool 86 to access reports generated by loyalty system 20. Card issuer system 86 may provide cardholder and transaction data 88 to loyalty system 20 regarding transactions and members for processing by data scrub utility 36 and storage by data storage device 50 as benefit accounts 52, member accounts 56, and transaction data 58.

Loyalty system 20 may include loyalty program module 22 which may be a hardware and software tool to manage the various loyalty programs managed by loyalty system 20. Loyalty programs may be particular to one or more merchants. A loyalty program may be used to provide incentives or offers to the customer or members.

Loyalty system 20 may include a text and speech processor 34. Text and speech processor 34 may include a text to speech synthesizer or engine for converting text based content to speech utterances. Text and speech processor 34 may also include a speech to text recognition engine for converting speech utterances into text based content. As described herein, text and speech processor 34 may integrate with dictionaries or data records of key words relating to customers, merchants, offers, etc. to facilitate recognition of commands within digitized audio files received from customer device 48.

In example embodiments described herein, merchant system 40 may be provided with tools to design and implement their own loyalty programs, design and implement their own benefits or incentives, including cross-promotional programs in conjunction with other merchants in the same community for example. The merchant system 40 may design and implement loyalty programs and incentives using merchant interface 28. Merchant system 40 may transmit merchant data (e.g. parameters for reports) to loyalty system 20 via merchant interface 28. Merchant system 40 may transmit customer and transaction data 44 (e.g. data regarding transactions and customers) to loyalty system 20 via merchant interface 28.

Similarly, in example embodiments described herein, card issuer system 80 may be provided with tools to design and implement their own loyalty programs, design and implement their own benefits or incentives, including cross-promotional programs in conjunction with other merchants in the same community for example. For example, points and rewards program utility 82 may interact with loyalty system 20 to manage loyalty programs for card issuers. Cardholder registration utility 84 may enable registration of cardholders directly with card issuer system 80 or via loyalty system 20.

Each customer may be associated with a market or demographic, which may be used by merchant system 40 and loyalty system 20 to recommend customer incentives and offers. A loyalty program incentive may be used to target particular consumer needs. Loyalty system 20 may recommend incentives via recommendation engine 30 tailored to segments of customers, where the recommendation may be based attributes of customers, such as spending habits, interests, needs, wants, charities, social habits, current location etc. Loyalty system 20 may recommend affinity entities based on customer attributes or merchant attributes, such as location, partnerships, goods and services, spending trends, interests, needs, wants, charities, social habits, etc.

The loyalty system 20 is operable, via the Internet for example, to engage in real time data communications with a merchant system 40, card issuer system 80, and also customer or member devices 28 (e.g. electronic device, smart phone, mobile device, laptop, tablet, navigation system, IVI devices, or other computing device). Accordingly, seamless data flows between these systems can be established in order to enable the capture of financial transactions and cardholder data, and also the accrual of benefits or incentives based on data provided to the loyalty system 20 the merchant system 40.

Loyalty system 20 is operable to provide system tools for the affinity system 60 to receive payments from the merchant systems 40 and card issuer systems 60 in connection with transactions between the merchants and the cardholders registered with the loyalty system 20. The reporting facility provides visibility to the affinity entity, the cardholders, the card issuers, and the merchant in regard to the amounts accrued and subsequently paid as donations at the end of the measurement period.

The loyalty system 20 may pre-determine the conditions under which this occurs. Typically, incentives or offers are associated with conditional transactions with merchants (e.g. the purchase of a particular good or service is required in order to receive the special offer or prize, cash payments, in-store transactions). This encourages cardholders to conduct transactions with merchants. When a registered cardholder enters into such a transaction with a merchant in connection with the loyalty system 20, a transaction amount is recorded. At the end of the reporting period the system aggregates the amounts for reporting purposes, and for calculating donations. Funds may distribute to the respective affinity systems 60.

Loyalty system 20 may recommend incentives particularly tailored to targeted segments of cardholders and potentially cardholders to further increase particular transactions. The recommended incentives and associated transactions are likely to be of interest to the targeted segment based on data mining and correlations of cardholder (and potential customer and cardholder) attributes. For example, the location of customer device 48 may be used to recommend incentives or offers as part of Offer Group to customer. The historical spending habits of a customer may also be used to recommend incentives or offers as part of Offer Group to customer. As a further example, merchant trends may also be used to recommend incentives or offers as part of Offer Group to customer. As an additional example, key words provided by customer in a request for offers may be used to recommend incentives or offers as part of Offer Group to customer. The recommendations for Offer Group may be generated by recommendation engine 30 by process data records in data storage device 50.

The end result may be the accrual of benefits and incentives the to the benefits account 34, which then in is disbursed on a periodic basis to the applicable parties.

Loyalty system 20 provides for a linkage of a data between merchant systems 40, card issuer systems 80, affinity systems 60, and cardholders (via customer device 48). Although only one merchant system 40 is shown in FIG. 2 for simplicity, there may be multiple merchant systems 40 connected to loyalty system 20. Although only one card issuer system 80 is shown in FIG. 2 for simplicity, there may be multiple card issuer systems 80 connected to loyalty system 20.

Loyalty and customer acquisition programs may be required to continually acquire new members, preferably at a low cost, e.g. through organic growth or through a partnership with various customer sources. Loyalty system 20 may retain cardholder databases of transaction information and other cardholder benefits, which may include data from other participating merchants. Loyalty system 20 may access the cardholder databases to detect cardholder and member attributes in order to recommend incentives via recommendation engine 30. Benefit accounts 52 may include records of offers for various merchants, as described herein.

Transaction data 58 may include (1) customer name; (2) payment method; (3) date of transaction; (4) merchant ID; (5) amount of purchase; and (6) goods and services. Other information may also be accessible such as demographic and geographic information relating the cardholder. This information may be stored in data storage devices 50 and accessed by loyalty system 20.

Loyalty system 20 enables each of the merchants and members to track the accrual of benefits by means of transactions that in connection with the loyalty system 20 result in the accrual of loyalty benefits (e.g. incentives). The transaction data may be collected by card issuer systems 80 for example, such as when customer uses an acquired account (e.g. credit card, debit card) for payment. The transaction data may be provided to loyalty system 20 via transaction data 58 at data storage device 58.

Loyalty system 20 is operable to store the data items mentioned above (and other similar data items) to the data storage device 50 and apply same against transactions between participating members and participating merchants. Loyalty system 20 may use the data items to recommend incentives or affinity entities, and corresponding transactions.

point conversion utility (not shown) enables enhancement of loyalty programs based upon points or donations as cardholder benefits created by cardholder use in connection with a loyalty program and provided by incentives offered to cardholder. The point conversion utility may allow the merchant to reward their cardholders in form of donations by converting loyalty program points to donation amounts. These points, donations, and rewards are examples of incentives. For example, point conversion utility may calculate 100 points for a transaction and record the transaction information and related conversion amount 100 points as cardholder attributes in storage device 50. The point conversion utility may also convert points from loyalty programs for specific card issuers to points for corresponding loyalty programs managed by loyalty system.

An example process in connection with the generation of reports based on the contents of data storage device 50 will now be described. A system administrator of the operator of the loyalty system 20 may access certain reports in connection with merchant activity in connection with customer demographics. Similar processes and system implementations may be used to generate other reports of information accessible to merchants, or members. The loyalty system 20 is operable to generate reports for merchants to track the use and monitor the results.

Loyalty system 20 may enable a merchant to target incentives to particular sub-groups of cardholders, depending on their interest (e.g. cardholder attributes) to merchant.

After a cardholder transaction has been completed the transaction data may be relayed to the loyalty system 20. The loyalty system 20 defines in accordance with a particular loyalty program a set of rules to complement loyalty programs by processing the transaction data (e.g. identified merchant, amount of transaction, date of transaction, time of transaction) to convert the transaction into points in connection with parameters set by each participating merchant. For instance, the system 20 may convert transaction incentives or prizes within the loyalty program to points to the cardholder based on a pre-determined formula. The loyalty system 20 would for example convert a $100.00 spent by a cardholder under a loyalty program into 100 points if the transaction was completed between the hours of 00:00:00 and 12:00:00 Monday through Friday and 50 points at any other time for the particular card used at a particular merchant.

As previously stated, a merchant belonging to the loyalty system 20 may choose to offer rewards/incentives/offers based upon time of day and date. The incentives may also be based on a particular good or service. The merchant provides selected information relating to particular demographics, affinity entities, transactions, dates and times (e.g. attributes). The loyalty system identifies the merchant, the time of day and the date and applies differential incentives through the loyalty system. The incentives may relate to a donation to an affinity entity as managed by donation utility 26.

Benefits, offers, or incentives may be accrued on behalf of members (including members who are cardholders) in a number of ways. The benefits themselves can vary. For example, pre-set benefit application or payment rates are associated with particular transactions associated with the loyalty system 20.

Within the loyalty system 20, merchants may be motivated to develop new and innovative loyalty programs (through the use of recommended incentives) that will automatically be accessible to cardholders. Loyalty system 20 may provide a means of generating financial transactions and/or customers for merchants.

Loyalty system 20 may provide flexibility in the arrangements made by the merchants, as it relates to the benefits provided to cardholders who become members. These arrangements can define the pre-determined benefits associated with particular transactions, e.g. a per transaction benefit to the cardholder.

Other configurations and extensions may be implemented by loyalty system 20. For example, various security methods and technologies for restricting access to resources of the loyalty system 20 to those authorized to do so by the operator of the loyalty system 20 may be used. Loyalty system 20 may use various existing and future technologies to process payments by operation of the transaction utility. Loyalty system 20 may provide various tools and interfaces for interacting with the loyalty system. The system 20 may also allow for robust reporting which may include comparative reports of member affinity or of transaction history with participating merchants. In other words, member transaction history may be different for differing groups of members based on member affinity.

Data storage device 50 maintains benefits accounts 52, merchant accounts 54, member accounts 56, transaction data 58 for storing attributes regarding offers/incentives, merchants, cardholders and transactions. Data storage device 50 may provide a persistent store for the various databases described herein. The attributes may be used to determine incentives for Offer Group in relation to various loyalty programs, and affinity entities to provide donations to. For example, data scrub utility 36 may retrieve data from data storage device 50 for provision to recommendation engine 30 to recommend offers involving donations to affinity entities, offers for merchants proximate to a location related to the customer (current location of customer device 48, location of customer's work place, location of customer's home, and so on). Data scrub utility 36 may normalize, scrub, convert and perform other operations on data received from other systems (e.g. merchant system 40, affinity system 60, card issuer system 80).

Cardholder registration 24 may enable cardholders to register for loyalty programs. Cardholder registration 24 may populate cardholder and transaction data 56, 58 based on data collected from registration. The Merchant reporting tool 46 may generate reports based on cardholder and transaction data 58 and data maintained by loyalty system 20 as part of data storage device 50. Data storage device 50 may maintain a copy of cardholder and transaction data 58, or may contain separate data. Loyalty program module 22 may be used to create and manage various loyalty programs for merchant system 40.

Loyalty system 20 may include a merchant interface 28 for interacting with merchant system 40 and generating various interfaces for display on merchant system 40. The merchant interface 28 may provide a mechanism for merchant system 40 to create, customize, and manage loyalty programs and incentives. Data scrub utility 36 may normalize, scrub, convert and perform other operations on data received from merchant system 40. Data scrub utility 36 may normalize, scrub, convert and perform other operations on data received from card issuer system 80.

Merchant system 40 may be configured with various computing applications, such as merchant reporting tool 46 for generating reports regarding loyalty programs and for displaying interfaces received from merchant interface 28 to create, customize, and manage loyalty programs and incentives, and view donation results for affinity entities, and so on. A computing application may correspond to hardware and software modules comprising computer executable instructions to configure physical hardware to perform various functions and discernible results. A computing application may be a computer software or hardware application designed to help the user to perform specific functions, and may include an application plug-in, a widget, instant messaging application, mobile device application, e-mail application, online telephony application, java application, web page, or web object residing, executing, running or rendered on the merchant system 40. Merchant system 40 is operable to authenticate merchants (using a login, unique identifier, and password for example) prior to providing access to applications and loyalty system 40. Merchant system 40 may be different types of devices and may serve one user or multiple merchants. Although merchant system 40 is depicted with various components in FIG. 1 as a non-limiting illustrative example, merchant system 40 may contain additional or different components, such as point of sale system or other transaction processing system.

Merchant system 40 may include one or more input devices, such as a keyboard, mouse, camera, touch screen and a microphone, and may also include one or more output devices such as a display screen and a speaker. Merchant system 40 has a network interface in order to communicate with other components, to serve an application and other applications, and perform other computing applications by connecting to network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Although only one merchant system 40 is shown for clarity, there may be multiple merchant systems 40 or groups of merchant systems 40 distributed over a wide geographic area and connected via e.g. network.

Merchant system 40 includes data storage devices storing merchant data 42 particular to the merchant, such as geographic location, inventory records, historical records, and the like. Data storage devices may also store customer and transaction data 44 such as customer names, addresses, contact information, target potential customers, transaction details, and so on.

Merchant system 40 may also include a kiosk or customer interface device to receive data from customers and determine location of customers (e.g. a customer is present in-store). This data may be used as the location identifier for the customer. This data may also be used to trigger the incentive and donation, as the kiosk or customer interface device provides a mechanism to verify that the customer is present at the brick and mortar store. Merchant system 40 may also include near field communication (NFC) technology to detect that customer device 48 is present in a brick and mortar store of merchant to trigger donations and incentives.

Card issuer system 80 may be configured with various computing applications, such as card issuer reporting tool 86 for generating reports regarding loyalty programs and for displaying interfaces received from loyalty system 20 to create, customize, and manage loyalty programs and incentives, and view donation results for affinity entities, and so on. A computing application may correspond to hardware and software modules comprising computer executable instructions to configure physical hardware to perform various functions and discernible results. A computing application may be a computer software or hardware application designed to help the user to perform specific functions, and may include an application plug-in, a widget, instant messaging application, mobile device application, e-mail application, online telephony application, java application, web page, or web object residing, executing, running or rendered on the merchant system 40. Card issuer system 80 is operable to authenticate users (using a login, unique identifier, and password for example) prior to providing access to applications and loyalty system 20. Card issuer system 80 may be different types of devices and may serve one user or multiple card issuers. Although card issuer system 80 is depicted with various components in FIGS. 12-13 as a non-limiting illustrative example, card issuer system 80 may contain additional or different components, such as point of sale system or other transaction processing system.

Card issuer system 80 may include one or more input devices, such as a keyboard, mouse, camera, touch screen and a microphone, and may also include one or more output devices such as a display screen and a speaker. Card issuer system 80 has a network interface in order to communicate with other components, to serve an application and other applications, and perform other computing applications by connecting to network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Although only one card issuer system 80 is shown for clarity, there may be multiple card issuer systems 80 or groups of card issuer systems 80 distributed over a wide geographic area and connected via e.g. network.

Card issuer system 80 includes data storage devices storing merchant data 42 particular to the merchant, such as geographic location, inventory records, historical records, and the like. Data storage devices may also store customer and transaction data 44 such as customer names, addresses, contact information, target potential customers, transaction details, and so on.

Customer device 48 may include processor and data storage devices. Customer device 48 may include one or more input devices, such as a keyboard, mouse, camera, touch screen and a microphone, and may also include one or more output devices such as a display screen and a speaker. Customer device 48 has a network interface in order to communicate with other components, to serve an application and other applications, and perform other computing applications by connecting to network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Although only one customer device 48 is shown for clarity, there may be multiple merchant systems 40 or groups of customer device 48 distributed over a wide geographic area and connected via e.g. network. Customer device 48 is configured with GPS, NFC or other location detection hardware to determine location of customer (e.g. location identifier) and to verify if the customer is present in a brick and mortar store of merchant.

Customer device 48 may be implemented using a mobile phone, mobile computing device, tablet, laptop, desktop, wearable device, IVI device, navigation system and so on. FIGS. 10 to 13 illustrate an example customer device 48 integrated with or located within a vehicle. This may illustrate a customer who is driving the vehicle, for example. The customer device 48 may also be carried by a customer who is not associated with a vehicle.

Where disclosed implementations are directed to an IVI (In-Vehicle Infotainment) device, such as may be installed as original factory equipment in a new automobile (e.g. the customer device 48 shown in an automobile in FIG. 10), the application executing to perform the disclosed implementations, and its IVI device, will preferably have multifunctional communications to connect the automobile to the cloud for different functions. As such, implementations disclosed here will interoperate with the automobile's built-in mapping and navigational system and thereby gain the advantage of understanding the driver's mission to verbally request and receive relevant and timely alerts about local business that want to help charities that serve the driver's community when the driver does business with those local businesses, and to navigate to those local business to take advantage of any such timely alert. The navigational system may communicate a current location of the customer and provide directions to the location of the merchant associated with the selected offer, for example.

Of course, implementations directed to an IVI device may also interoperate with other functionalities, such as telematics (e.g., Onstar), navigation, the logging of diagnostics, connecting to internet radio (e.g., Pandora), and connecting telephone calls. As such, disclosed implementations with an IVI device (e.g. customer device 48) or otherwise with connected automobile passengers' smartphones and/or e-tablets with IVI features and other cloud and Internet services. Any such IVI system implementation will preferably prioritize alerts to avoid distracting the driver, and most preferably will deliver such information to the driver, as disclosed elsewhere herein, as audio rendered alerts to avoid being a related cause to an accident or an injury, and also to avoid potential consequences of driver distraction from the user interface to the IVI system.

Loyalty system 20 (and in particular donation utility 26) may interact with an affinity system 60 to provide charitable incentives (e.g. an incentive involving a donation by the merchant to an affinity entity). Affinity system 60 may include a data storage device with donor data 68. Affinity system 60 may include a loyalty interface 62 for generating interfaces populated with data from loyalty system 20.

For example, a correlation may be made between donor data 68 and benefits accounts 52 or card holder data 58 to determine whether any donors are also cardholders. If so, then recommendation engine 30 may recommend an incentive with a donation portion to the affinity entity associated with affinity system 60.

Affinity system 60 may include a registration tool 64 to register users to become donors, and potentially cardholders of a loyalty program created by loyalty system 20. The registration tool 64 provides a mechanism to collect attributes regarding donors.

Affinity system 60 or affinity utility 70 is operable to identifying donors associated with an affinity entity. The donors may be cardholders or potential cardholders for a loyalty program provided by loyalty system 20. The donors are associated with attributes, such as the example attributes described herein in relation to cardholders.

Affinity system 60 or affinity utility 26 is operable to determine which donors are cardholders and which are not. Affinity system 60 or affinity utility 26 is operable to invite those donors which are not cardholders to participate in a loyalty program offering incentives that include donations to the affinity entity. These may be recommended incentives based on their past donations.

Affinity system 60 or affinity utility 26 is operable to identify a merchant and a transaction. Affinity system 60 may contact a merchant upon detecting that a subset of donors are also customers, potential customers, or cardholders to arrange for an incentive provided by merchant that includes a donation to the affinity entity. The transaction may identify a good or service of interest to the donors based on the attributes.

Affinity system 60 or affinity utility 70 is operable to select an incentive based on the affinity entity, the attributes, the merchant, and the transaction. The incentive defines a benefit provided by the merchant to the affinity entity upon the occurrence of a transaction involving the merchant and one or more donors. In this way, a donor is motivated to transact with the merchant due to the donation provided to their preferred affinity entity. Affinity system 60 or affinity utility 70 may contact donors encouraging them to transact with a merchant, as this may result in an increase in donations to the affinity entity. The merchant may have access to a new set of potential customers via affinity system 60. The loyalty system 20 may consider the buying patterns of donors to recommend incentives with a donation component. This also allows merchants to see what customers are also donors and tailor incentives accordingly.

Affinity system 60 may be used to manage events and the attendee list may also receive the recommended incentive. This may increase transactions for merchants, as well as increase donations if there is an additional incentive offered by merchants. The merchant and charity may set a donation rate which may be a fixed or proportional amount. For example, a percentage of the transaction amount may be given as a donation.

Figure 14:
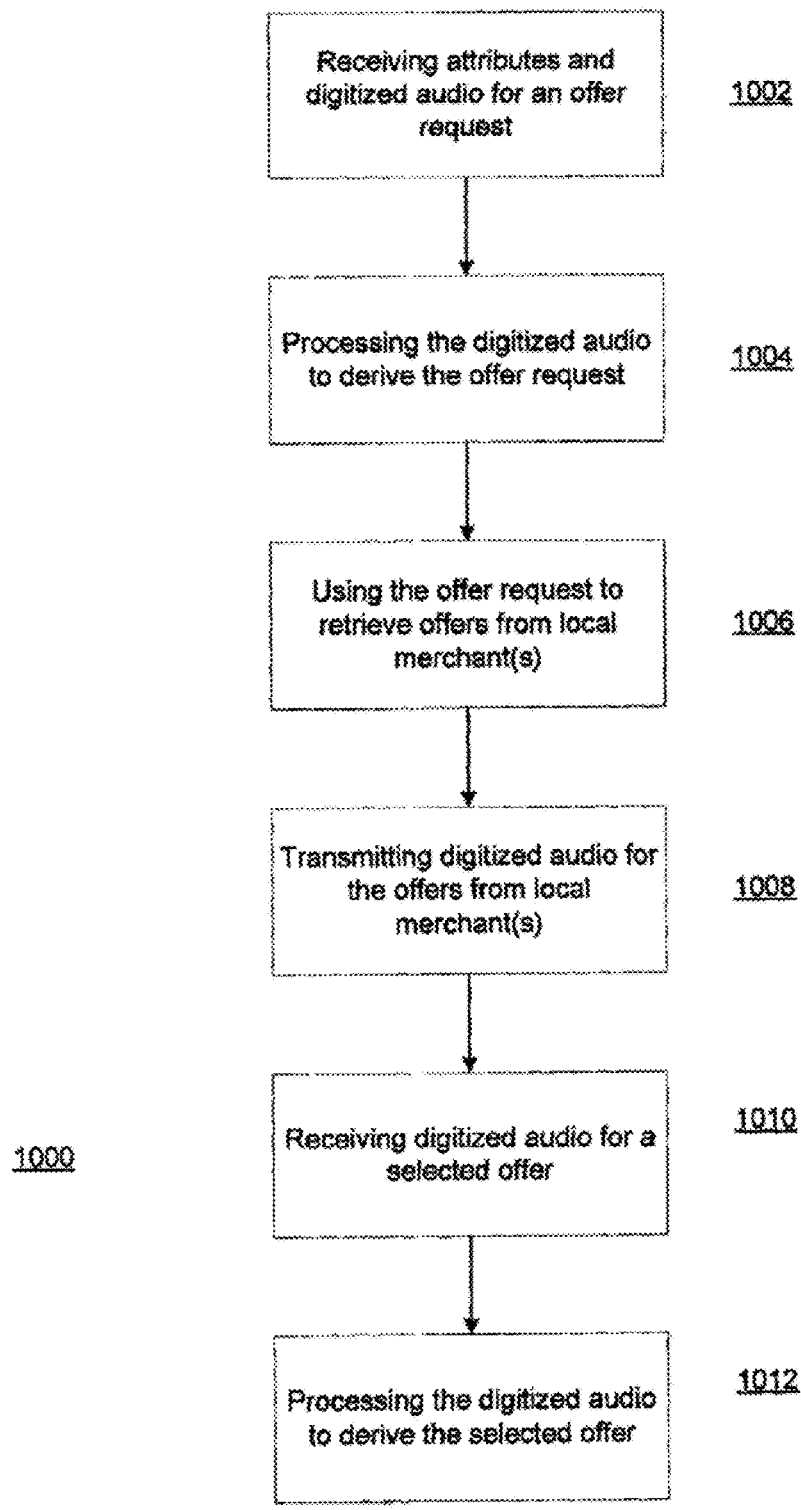
FIG. 14 illustrates an example flowchart of a method according to embodiments described herein.

Referring now to FIG. 14 there is shown a method 1000 in accordance with example embodiments. The method 1000 may be implemented similar to method steps described in relation to FIGS. 1 and 4. That is method 1000 may correspond to one or more steps as described in relation to FIGS. 1 and 4.

At 1002, loyalty system 20 (e.g. via donation audit web service 214/514/714) receives a transmission from customer device 28 that includes attributes and a digitized audio data containing at least one keyword of a request for offers. The attributes may include an identifier for the geo-location of a transmitter of the transmission (e.g. customer device 48), an identifier for a customer, and other data relating to offers, such as an identification of goods and services and so on.

For example, a customer may be driving home from work and interested in purchasing food for dinner. The customer device 48 may include a GPS or other location tool (e.g. triangulation, Wi-Fi) to provide the location of the customer to the loyalty system 20 along with the digital audio file indicating "dinner", "pizza", and so on. The loyalty system 20 is operable to process the request to locate offers relating to pizza or other dinner items for merchants proximate to the located of the customer device 48. A customer account 56 may also store historical data regarding transactions, affinity entities, and offers related to the customer for use by recommendation engine 30 to determine offers for Offer Group. The customer account 56 may include favorites and a profile for use by recommendation engine 30 to determine offers for Offer Group. The customer profile may be maintained by card issuer system 80 based on transaction data collected in relation to customers. The customer may need to opt in to loyalty system 20 to permit sharing of transaction data in customer profile.

At 1004, loyalty system 20 performs, using the text and speech processor 34, a speech-to-text conversion on the digitized audio data to derive one or more identifier for the keyword(s) of the request. That is, text and speech processor 34 processes the audio data to derive keywords relating to offer requests. The keywords may relate to locations, merchants, affinity entities, goods and services, etc. For example, the audio data may indicate "pizza" (good) and "homelessness" (affinity) which may indicate that the customer is interested in offers involving pizza where the affinity entity relates to helping people in need of a home or shelter. The keywords may be referred to herein as an offer request.

In some example embodiments, instead of process 1000 initiating with a customer offer request, the process 1000 may initiate with an offer alert by one or more merchants. That is, system may detect that customer is proximate to one or more merchants and send alerts regarding offers (e.g. Offer Group) without receiving an offer request. An alert may also be transmitted to a merchant to notify the merchant that a customer is proximate merchant location (or located within the store) and recommend one or more offers for the customer.

At 1006, loyalty system 20 accesses one or more databases stored at data storage device 50, using identifiers for the keywords, the customer, and the geo-location of the transmitter of the transmission, to look-up information corresponding to offers. The recommendation engine 30 may generate recommendations for offers for Offer Group based on the location, keywords in the audio file, historical data for the customer, merchant trends, time of day, day of the week, season, affinity entity and so.

The offers may relate to a residential community of the customer, merchants having a physical address in the residential community of the customer, merchants having an attribute matching the identifier for the keyword (e.g. merchants offering a good or service referred to), merchants having an unexpired offer to make a donation to an affinity entity having a physical address in the residential community of the customer. For each merchant, loyalty system 20 may calculate navigation data using the identifier for the geo-location of the customer device 48 and the physical address of the merchant. Loyalty system 20 uses the keywords in the audio file (offer request) to identify offers for the Offer Group. Each offer may be associated with a timestamp to link the offer to relevant times for the merchant (e.g. off peak times) or to relevant times for the customer (e.g. dinner time). The offers may be associated with donations to affinity entities, and may include details regarding the amount of the donation and so on. This may assist the customer in selecting the offer (e.g. the highest donation to charity).

At 1008, loyalty system 20 performs, using the text and speech processor 34, a text-to-speech conversion of the offers in the Offer Group into digitized audio data for transmission to the customer device 48. The digitized audio file may include offers indicating names of the merchants, details of the offer, names of the affinity entities and so on. The digitized audio file may also include navigation data, such may be used by a IVI device or navigation tool at customer device 48. The loyalty system 20 transmits the digitized audio data for the Offer Group to the customer device 48.

At 1010, loyalty system 20 receives, in response to the transmission of the digitized audio data, digitized audio input corresponding to a selected offer. The audio input may include an identifier for one of the merchants corresponding to an offer in the Offer Group.

At 1012, loyalty system 20 performs, using the text and speech processor 34, a speech-to-text conversion on the digitized audio data to derive the selected offer or the identifier for the merchant corresponding to the selected offer.

The loyalty system 20 may transmit a logical address for the merchant, an identifier for the customer, the navigation data, the corresponding unexpired offer to make the donation to the affinity entity having the physical address in the residential community of the customer, and so on, to the merchant system 40, the customer device 48, or other systems.

The selected offer may be provided as a token to customer device 48 (e.g. bar code, token, QR code, file, identifier) for provision to merchant to redeem the offer. The transaction may be completed remotely using the customer device 48. The loyalty system 20 may provide soft alerts and reminders regarding unused selected offers.

The navigation data may be used to populate a mapping application with location identifiers for each offer in the Offer Group. For example, little heart symbols may be used to mark a map with corresponding merchants that will make donations based on offers in the Offer Group. The navigation data may be used to populate a real time navigation system in a vehicle device or other customer device 48. A mapping interface may also be used by the customer to provide location information at 1002 such as an area of interest for offers, a perimeter for offer locations, specific sections of the map for offer locations, and so on. The offers may be related to a street on a map, or several proximate streets to give customer a number of offers for a particular location of interest.

The herein described databases for storage media may comprise primary, secondary, and/or tertiary storage media. Primary storage media may include memory such as random access memory and/or read-only memory, for example. Secondary storage media may include a mass storage such as a magnetic or solid-state hard drive. Tertiary storage media may include removable storage media such as a magnetic or optical disk, a magnetic tape, a solid-state storage device, etc. In certain implementations, the storage media or portions thereof may be operatively receptive of, or otherwise configurable to couple to, other components of a computing platform, such as a processor. Data storage device 50 may provide a persistent store for databases described herein.

In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating,", "identifying", "determining", "establishing", "obtaining", and/or the like refer to tangible actions or processes of a specific apparatus, such as a special purpose computer or a similar special purpose electronic computing device that generate discernible results. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general-purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, various other modifications may be made, and equivalents may be substituted, without departing from claimed subject matter. Additionally, many modifications may be made to adapt a particular situation to the teachings of claimed subject matter without departing from the central concept described herein. Therefore, embodiments may not be limited to the particular examples disclosed, but may also include all aspects falling within the scope of appended claims, and equivalents thereof.

The various steps or acts in a method or process may be performed in the order shown, or may be performed in another order. Additionally, one or more process or method steps may be omitted or one or more process or method steps may be added to the method and processes. An additional step, block, or action may be added in the beginning, end, or intervening existing elements of the methods and processes. Based on the disclosure and teachings provided herein, a person of ordinary skill in the art will appreciate other ways and/or methods for various implements. Moreover, it is understood that a functional step of described methods or processes, and combinations thereof can be implemented by computer program instructions that, when executed by a processor, create means for implementing the functional steps. The instructions may be included in non-transitory computer readable medium that can be loaded onto a general-purpose computer, a special purpose computer, or other programmable apparatus.

In the preceding detailed description, numerous specific details have been set forth to provide a thorough understanding of embodiments described herein. However, some embodiments may be practiced without these specific details. In other instances, methods and systems that would be known by one of ordinary skill have not been described in detail so as not to obscure claimed subject matter.

What is claimed is:

1. A method comprising:
   receiving an account holder identifier and digitized audio data containing a request for an offer from a merchant to account holders to make a purchase from the merchant in exchange for the merchant making a donation to a charity;
   deriving the request from the digitized audio data;
   using the derived request to access and retrieve offers each being from a merchant to account holders to make a purchase from the merchant in exchange for the merchant making a donation to a charity;
   converting each said retrieved offer into a digitized audio file;
   transmitting the digitized audio file to the transmitter;
   receiving, in response to the transmitted digitized audio file, a digitized audio data containing a selected one said retrieved offer;
   deriving the selected one said retrieved offer from the digitized audio data;
   receiving an acknowledgement that a transaction has been conducted for the selected one said retrieved offer; and
   transmitting a message containing the donation to be made to the charity by the merchant making the selected one said retrieved offer.

2. The method as defined in claim 1, further comprising:
   receiving information for the transaction including the date and the time, a currency amount, and identifiers for the merchant and the account holder;
   and
   for each said transaction for which the date and time are prior to an expiration date of the offer by the one said merchant to make the donation to the charity having the physical address in the residential community of the account holder:
      using the identifier for the one said merchant to access a database to retrieve a business rule for making the donation to the charity having the physical address in the residential community of the account holder;
      using the identifier for the account holder to retrieve a business rule for the merchant to make the donation to the charity;
      deriving, using the business rules of the merchant and the account holder, the donation to the charity; and
      transmitting a message containing the donation to be made by the merchant.

3. The method as defined in claim 1, wherein the steps further comprise:
   for a plurality of said messages each containing the donation to be made to the charity by the merchant making the selected one said retrieved offer, calculating the sum of the donations in the messages;
   receiving information from the charity as to the total donations made to the charity by the merchant making the selected one said retrieved offer;
   deriving a difference between the total donations and the calculated sum of the donations in the messages; and
   transmitting a message containing the derived difference to the merchant making the selected one said retrieved offer.

4. The method as defined in claim 1, wherein the donation to be made to the charity by the merchant making the selected one said retrieved offer is a function, at least in part, of a currency amount of the transaction.

5. The method as defined in claim 1, wherein the access and retrieval of offers includes:
forming a first set of said merchants;
forming a second set of said merchants from the first set thereof that also have an attribute matching an attribute derived from the request from the digitized audio data; and
forming a third set of said merchants from the second set thereof each of which also have an unexpired offer to the account holders to make a purchase from the merchant in exchange for the merchant making a donation to a charity, wherein each said retrieved offer an unexpired offer from a merchant in the third set of said merchants.

6. A non-transient computer readable medium comprising software executed by hardware to perform the steps of the method as defined in claim 1.

7. A non-transient computer readable medium comprising software executed by hardware to perform the steps of the method as defined in claim 3.

8. A method comprising:
receiving a transmission that includes:
digitized audio data containing a keyword of a request;
an identifier for the geo-location of a transmitter of the transmission; and
an account number for an account holder;
performing a speech-to-text conversion on the digitized audio data to derive identifier for the keyword of the request;
accessing one or more databases, using the identifier, the account number of the account holder, and the geo-location of the transmitter of the transmission to look-up information corresponding to:
a geographic area corresponding to the account holder;
a first set of merchants having a physical address in the geographic area corresponding to the account holder;
a second set of said merchants in the first set having an attribute matching the identifier for the keyword;
a third set of said merchants in the second set having an unexpired offer to make a donation to an affinity entity having a physical address in the geographic area corresponding to the account holder; and
for each said merchant in the third set:
calculating navigation data using the identifier for the geo-location of the transmitter of the transmission and the physical address of the merchant;
performing a text-to-speech conversion into digitized audio data of:
a name of the merchant; and
the navigation data;
transmitting the digitized audio data for the third set of merchants for delivery to the transmitter;
receiving, in response to the transmission of the digitized audio data, digitized audio input that includes an identifier for one said merchants in the third set;
performing a speech-to-text conversion on the digitized audio data to derive the identifier for the one said merchant in the third set;
transmitting to a logical address for the one said merchant in the third set data selected from the group consisting of:
an identifier for the account holder;
the corresponding said calculated navigation data; and
the corresponding said unexpired offer to make the donation to the affinity entity having the physical address in the geographic area corresponding to the account holder;
receiving acknowledgement of a transaction between the account holder and the one said merchant in the third set; and
transmitting a message containing the donation to be made to the donation to the affinity entity having the physical address in the geographic area corresponding to the account holder.

9. The method as defined in claim 8, further comprising:
receiving information including the date and the time, a currency amount, and identifiers for the merchant and the account holder;
when:
the identifiers for the merchant and the account holder respectively correspond to the identifiers of the account holder and the one said merchant in the third set data; and
the date and time of the transaction are prior to an expiration date of the offer by the one said merchant in the third set data to make the donation to the affinity entity having the physical address in the geographic area corresponding to the account holder:
then:
using the identifier for the one said merchant in the third set data to access a database to retrieve a business rule for making the donation to the affinity entity having the physical address in the geographic area corresponding to the account holder;
using the identifier for the account holder to retrieve a business rule for the merchant to make the donation to the affinity entity having the physical address in the geographic area corresponding to the account holder;
deriving, using the business rules of the merchant in the third set and the account holder, the donation to the affinity entity having the physical address in the geographic area corresponding to the account holder; and
transmitting a message containing the donation to be made by the merchant to the affinity entity for the predetermined time period to a logical address of the merchant.

10. The method as defined in claim 9, further comprising:
receiving a plurality of donation receipts each including:
the respective identifiers for one said merchant and one said affinity entity; and
a currency amount;
and
for each said identifier for one said merchant, deriving the sum of the currency amounts of the donation receipts for each said identifier for one said affinity entity.

11. The method as defined in claim 10, further comprising, after a predetermined audit time period for each said identifier for one said merchant, for each said affinity entity to whom a donation was to be made by the merchant for the predetermined time period:
determining a difference between:
the sum of the currency amounts of the donation receipts that were transmitted to the logical address of the merchant for the affinity entity; and
the sum of the currency amounts of the donation receipts that were received for the affinity entity for the merchant for the predetermined time period;

and
transmitting the determined difference to a logical address selected from the group consisting of:
the logical address of the merchant;
the logical address of the account holder;
the logical address of the affinity entity; and
a combination thereof.

12. The method as defined in claim 8, further comprising retrieving, using at least one of the respective merchant, account holder, and affinity entity identifiers, a logical address selected from the group consisting of:
the logical address of the merchant;
the logical address of the account holder;
the logical address of the affinity entity; and
a combination thereof.

13. The method as defined in claim 11, wherein the derivation of the donation to be made by the merchant to the affinity entity for the predetermined time period using the respective account holder and merchant donation business rules is a function, at least in part, of the received currency amount.

14. A non-transient computer readable medium comprising software executed by hardware to perform the steps of the method as defined in claim 8.

15. A system comprising hardware executing software that is operable to:
receive:
digitized audio data containing a keyword of a request;
an identifier for the geo-location of a transmitter of the transmission; and
an identifier for an account holder;
perform a speech-to-text conversion on the digitized audio data to derive identifier for the keyword of the request;
access one or more databases, using the identifier, the account number of the account holder, and the geo-location of the transmitter of the transmission to look-up information corresponding to:
a geographic area corresponding to the account holder;
a first set of merchants having a physical address in the geographic area corresponding to the account holder;
a second set of said merchants in the first set having an attribute matching the identifier for the keyword;
a third set of said merchants in the second set having an unexpired offer to make a donation to an affinity entity having a physical address in the geographic area corresponding to the account holder;
and
for each said merchant in the third set:
calculate navigation data using the identifier for the geo-location of the transmitter of the transmission and the physical address of the merchant;
perform a text-to-speech conversion into digitized audio data of:
a name of the merchant; and
the navigation data;
transmit the digitized audio data for the third set of merchants for delivery to the transmitter;
receive, in response to the transmission of the digitized audio data, digitized audio input that includes an identifier for one said merchants in the third set;
perform a speech-to-text conversion on the digitized audio data to derive the identifier for the one said merchant in the third set;
transmit to a logical address for the one said merchant in the third set data selected from the group consisting of:
an identifier for the account holder;
the corresponding said calculated navigation data; and
the corresponding said unexpired offer to make the donation to the affinity entity having the physical address in the geographic area corresponding to the account holder;
receive acknowledgement of a transaction between the account holder and the one said merchant in the third set;
and
transmit a message containing the donation to be made to the donation to the affinity entity having the physical address in the geographic area corresponding to the account holder.

16. The system as defined in claim 15, wherein the hardware executing the software is further operable to:
receive information for the transaction and including the date and the time, a currency amount, and identifiers for the merchant and the account holder;
and
when:
the identifiers for the merchant and the account holder respectively correspond to the identifiers of the account holder and the one said merchant in the third set data;
and
the date and time of the transaction are prior to an expiration date of the offer by the one said merchant in the third set data to make the donation to the affinity entity having the physical address in the geographic area corresponding to the account holder:
then:
use the identifier for the one said merchant in the third set data to access a database to retrieve a business rule for making the donation to the affinity entity having the physical address in the geographic area corresponding to the account holder;
use the identifier for the account holder to retrieve a business rule for the merchant to make the donation to the affinity entity having the physical address in the geographic area corresponding to the account holder;
derive, using the business rules of the merchant in the third set and the account holder, the donation to the affinity entity having the physical address in the geographic area corresponding to the account holder;
and
transmit a message containing the donation to be made by the merchant to the affinity entity for the predetermined time period to a logical address of the merchant.

17. The system as defined in claim 15, wherein the hardware executing the software is further operable to:
receive a plurality of donation receipts each including:
the respective identifiers for one said merchant and one said affinity entity; and
a currency amount;
and
for each said identifier for one said merchant, derive the sum of the currency amounts of the donation receipts for each said identifier for one said affinity entity.

18. The system as defined in claim 17, wherein the hardware executing the software is further operable, after a predetermined audit time period for each said identifier for one said merchant, for each said affinity entity to whom a donation was to be made by the merchant for the predetermined time period, to:
  determine a difference between:
    the sum of the currency amounts of the donation receipts that were transmitted to the logical address of the merchant for the affinity entity; and
    the sum of the currency amounts of the donation receipts that were received for the affinity entity for the merchant for the predetermined time period;
  and
  transmit the determined difference to a logical address selected from the group consisting of:
    the logical address of the merchant;
    the logical address of the account holder;
    the logical address of the affinity entity; and
    a combination thereof.

19. The system as defined in claim 16, wherein the hardware executing the software is further operable to retrieve, using at least one of the respective merchant, account holder, and affinity entity identifiers, a logical address selected from the group consisting of:
  the logical address of the merchant;
  the logical address of the account holder;
  the logical address of the affinity entity; and
  a combination thereof.

20. The system as defined in claim 18, wherein the derivation of the donation to be made by the merchant to the affinity entity for the predetermined time period using the respective account holder and merchant donation business rules is a function, at least in part, of the received currency amount.

* * * * *